(12) United States Patent
Tsuboi et al.

(10) Patent No.: US 8,582,586 B2
(45) Date of Patent: Nov. 12, 2013

(54) VEHICLE ONBOARD GATEWAY APPARATUS

(75) Inventors: Michitaka Tsuboi, Wako (JP); Makoto Ikeda, Wako (JP); Yoshiaki Murata, Wako (JP); Kazuhisa Yamamoto, Wako (JP); Kazuo Hirabayashi, Wako (JP); Tetsuya Yashiki, Wako (JP); Kazunari Okada, Wako (JP); Shuji Tomimatsu, Wako (JP); Hiroshi Nishimura, Yokohama (JP)

(73) Assignees: Honda Motor Co., Ltd., Tokyo (JP); Honda Elesys Co., Ltd., Yokohama-Shi (JP)

( * ) Notice: Subject to any disclaimer, the term of this patent is extended or adjusted under 35 U.S.C. 154(b) by 716 days.

(21) Appl. No.: 12/752,807

(22) Filed: Apr. 1, 2010

(65) Prior Publication Data

US 2010/0329272 A1 Dec. 30, 2010

(30) Foreign Application Priority Data

Apr. 3, 2009 (JP) .................................. 2009-091591

(51) Int. Cl.
*H04L 12/28* (2006.01)
*H04L 12/66* (2006.01)

(52) U.S. Cl.
USPC ......................................... 370/401; 370/392

(58) Field of Classification Search
USPC ............ 370/401, 392; 701/1, 29, 33; 709/229
See application file for complete search history.

(56) References Cited

U.S. PATENT DOCUMENTS

| | | | | |
|---|---|---|---|---|
| 6,397,282 | B1 * | 5/2002 | Hashimoto et al. | 710/260 |
| 7,787,479 | B2 * | 8/2010 | Matsuo et al. | 370/401 |
| 2006/0287784 | A1 * | 12/2006 | Kanki | 701/29 |
| 2009/0261958 | A1 * | 10/2009 | Sundararajan et al. | 340/436 |
| 2011/0225332 | A1 * | 9/2011 | Weng et al. | 710/107 |

FOREIGN PATENT DOCUMENTS

| | | |
|---|---|---|
| JP | 2003-115852 | 4/2003 |
| JP | 2006-191337 | 7/2006 |
| JP | 2006-333438 | 12/2006 |
| JP | 2008-172353 | 7/2008 |

* cited by examiner

*Primary Examiner* — Hassan Kizou
*Assistant Examiner* — Emmanuel Maglo
(74) *Attorney, Agent, or Firm* — Rankin, Hill & Clark LLP

(57) ABSTRACT

In an onboard gateway apparatus, when data is received from one network, the received data is stored in the buffer. The buffer includes a first storage area for storing data in the order of priority of an identifier (ID) attached to the data and a second storage area for storing data in the order in which the data is received. A control means stores the received data in one of the first and second storage areas based on the attached identifier, and sends the data to another network in accordance with the priority of the ID of the data. As to data passing through the first storage area, sending in the order of priority is ensured. As to data passing through the second storage area, sending in the order in which the data is received is ensured.

3 Claims, 15 Drawing Sheets

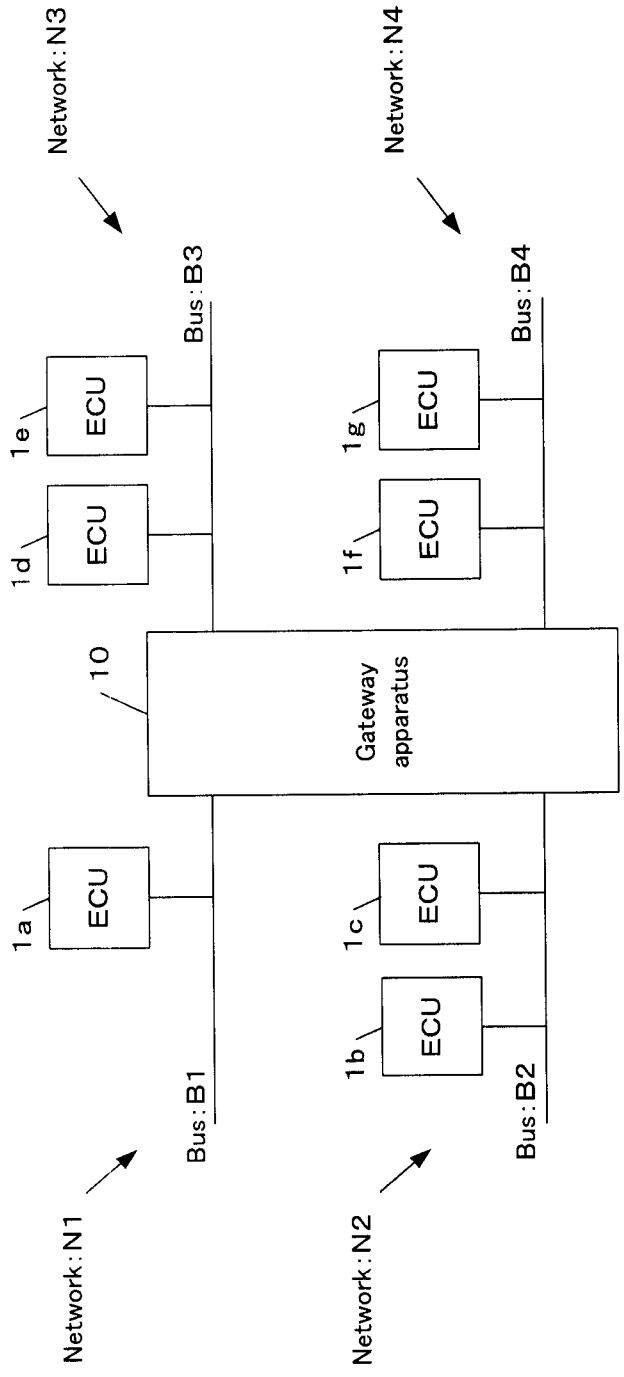

Figure 4

Routing map

| Label | ID | Receiving bus | Sending bus | Destination FIFO |
|---|---|---|---|---|
| 1 | 100 | F1 | F2, F3 | 1 |
| 2 | 110 | F2 | F1 | 1 |
| 3 | 120 | F1 | F1 | 1 |
| 4 | 200 | F3 | F2 | 1 |
| 5 | 300 | F2 | F3 | 1 |
| 6 | 500 | F2 | F3 | 2 |
| .. | .. | .. | .. | .. |

Figure 5

(a) Priority order storage area

| Label | Data | Receiving flag | Sending MB |
|---|---|---|---|
| 1 | | | |
| 2 | | | |
| 3 | | | |
| 4 | | | |
| 5 | | | |
| .. | | | |

(b) Sending MB table

| MB1 | MB2 | MB3 |
|---|---|---|
| | | |

(c) Receiving order storage area (FIFO buffer)

VEHICLE ONBOARD GATEWAY APPARATUS

BACKGROUND OF THE INVENTION

The present invention relates to a gateway apparatus mounted on a vehicle.

In recent vehicles, a plurality of electronic control units (referred to as ECUs) such as an ECU for an engine control, an ECU for a door control, an ECU for an airbag, and an ECU for navigation are mounted. A gateway apparatus for connecting these ECUs via a plurality of networks has been proposed such that these ECUs can communicate with each other.

Japanese Patent Publication Laid-Open (JP-A) No. 2008-172353 discloses a vehicle onboard relay apparatus (gateway apparatus) for providing a sending queue for each of ports corresponding to connected plurality of networks, adding sender information to received data, determining an order in which the received data is sent based on the sender information and a priority (ID) of the received data, and storing the received data in the sending queue of the port of a network to which the received data is to be sent.

A plurality of electronic control units (ECUs) mounted on a vehicle perform various controls for various parts of the vehicle. The controls have various contents, and various kinds of data are sent and received between in-vehicle networks. By establishing a priority order for various kinds of data, data having a higher priority can be preferentially transferred as compared to data having a lower priority. On the other hand, for some kinds of data, it is desired to perform the data transfer in a fixed order. If the data transfer according to the priority is performed for all the cases, the order of sending of such kinds of data may be disturbed.

In the configuration of the gateway apparatus in the above patent document, data transfer is performed in the order of priority. On the other hand, the gateway apparatus uses the sender information to determine whether data is received from the same network or from the same onboard communication apparatus. The order in which the data is sent is maintained for data received from the same network or the same onboard communication apparatus.

Because the sender information is used, it is required, when the received data is stored in the sending queue, to compare not only the priority of the received data but also the sender information with data already stored in the sending queue, which may increase a processing load. Such a load may also increase in accordance with the number of the stored data, and hence a time period from receiving data to sending the data may increase. Because the sender information is added, the amount of transferred data may increase.

Therefore, a vehicle onboard gateway apparatus that is capable of sending data in the order of priority for one kind of data while sending data in the order in which the data is received for the other kind of data, with avoiding an increase of a processing load, is desired.

SUMMARY OF THE INVENTION

According to one aspect of the present invention, a gateway apparatus, to which a plurality of networks are connected, for transferring data from one network to another network is provided. When data is received from the one network, the gateway apparatus stores the received data in a buffer. The gateway apparatus serially sends data stored in the buffer to the another network in accordance with a priority of an identifier attached to the stored data. The buffer includes a first storage area for storing the received data in the order of priority and a second storage area for storing the received data in the order in which the data is received. The received data is stored in one of the first storage area and the second storage area based on the identifier attached to the received data. Data stored in the first storage area and the second storage area is sent to the another network in accordance with the priority of the identifier attached to the data.

According to this invention, the first storage area for storing data to be sent in accordance with the priority and the second storage area for storing data to be sent in the order in which the data is received are separately provided. Data stored in the second storage area is sent to a destination network considering the priority from the viewpoint of relationship with the data stored in the first storage area. However, as to relationship between individual data in the second storage area, data is sent to a destination network in accordance with the order in which the data is received (referred to as receiving order). Therefore, sending according to the priority order is performed for one kind of data while sending according to the receiving order is performed for another kind of data. Furthermore, sending according to the priority order and sending according to the receiving order are controlled based on an identifier. Therefore, additional information such as sender information is not required. An increase in the amount of data can be prevented. A load processing can be reduced.

According to one embodiment of the present invention, the gateway apparatus comprises a sending message box for temporarily storing data transferred from the buffer such that the data is waiting to be sent. The sending message box includes a plurality of first sending message boxes for storing only data from the first storage area of the buffer and a single second sending message box for storing only data from the second storage area of the buffer. The number of the first sending message boxes is less than the number of the identifiers. The gateway apparatus serially sends data stored in the first sending message boxes and the second sending message box to the another network in accordance with the priority of the identifier of the data.

According to this invention, a sending message box for kinds of data to be sent in accordance with the priority and a sending message box for kinds of data to be sent in accordance with the receiving order are separately provided. Between the fist and second message boxes, sending is performed in accordance with the priority. However, because there is only one second sending message box, the order of data to be sent in accordance with the receiving order is not disturbed. Especially, in a case where data is replaced in the first sending message boxes, if data from the second storage area is stored in the first sending message box, an influence of such replacement may disturb the sending order. The present invention can avoid such phenomenon.

Furthermore, because the first sending message box and the second sending message box are separately provided, data according to the priority order and data according to the receiving order follow separate processing routes. Therefore, a comparison with each other is not required, and hence a processing load can be reduced. Although a priority comparison is made after data is stored in a sending message box, the processing load for such comparison can be suppressed because the number of the sending message boxes is less than the number of identifiers.

According to one embodiment of the present invention, in the second storage area, data consisting of a plurality of data blocks is stored on a data-block by data-block basis in the order in which the data blocks are received. The gateway apparatus serially sends data consisting of the plurality of data blocks stored in the second sending message box with a higher priority over the first sending message boxes until sending of the data consisting of the plurality of data blocks to the another network is completed.

As data stored in the second storage area, for example, there is management data for diagnosing and maintaining a vehicle. As data stored in the first storage area, for example, there is control data for controlling each part of a vehicle based on a present operating state of the vehicle. According to this invention, such management data can be divided into a plurality of data blocks and sent preferentially. Therefore, management data, which generally has a larger volume than control data, can be quickly communicated in diagnoses and maintenance scenes conducted during a stop of the vehicle, thereby quickly implementing the diagnosis and maintenance.

According to one embodiment of the present invention, in the second storage area, data to which an identifier corresponding to data used for diagnosis and maintenance of a vehicle is attached is stored. According to this invention, by using an identifier for data used for diagnosis and maintenance, the data can be passed through the gateway apparatus on a route separated from the control data. Because it can be determined based on only the identifier whether to send data in the receiving order or in the priority order, an existing data format can be used, thereby preventing an increase in the amount of data.

Other features and advantages of the present invention will be apparent from the following detailed description of the present invention and the accompanying drawings.

BRIEF DESCRIPTION OF THE DRAWINGS

FIG. 1 shows an overall structure of an in-vehicle network in accordance with one embodiment of the present invention;

FIG. 2 shows a structure of a frame of data in accordance with one embodiment of the present invention;

FIG. 4 shows a structure of a routing map in accordance with one embodiment of the present invention;

FIG. 5 shows a structure of a priority order storage area, a sending MB table, and a receiving order storage area in accordance with one embodiment of the present invention;

DESCRIPTION OF THE PREFERRED EMBODIMENTS

Preferred embodiments of the present invention will be described referring to the attached drawings. FIG. 1 schematically shows a structure of networks in a vehicle to which an onboard gateway apparatus is connected. In the vehicle, a plurality of electronic control units (ECUs) are mounted. For example, these ECUs include an ECU for an engine control, an ECU for a door control, an ECU for an airbag control, and an ECU for a navigation system. These ECUs are implemented as computers each having a central processing unit (CPU) and a memory.

In the example of the figure, an ECU 1a is connected to a bus B1 in a network N1, an ECU 1b and an ECU 1c are connected to a bus B2 in a network N2, an ECU 1d and an ECU 1e are connected to a bus B3 in a network N3, and an ECU 1f and an ECU 1g are connected to a bus B4 in a network N4. In this embodiment, the buses B1 through B4 form an in-vehicle LAN based on a bus network topology.

The buses B1 through B4 are connected to a gateway apparatus 10. The networks N1 through N4 are connected with each other through the gateway apparatus 10. Therefore, the ECUs 1a through 1g can communicate with each other through the gateway apparatus 10 according to a predetermined communication protocol. In this embodiment, a well known CAN (controller area network) protocol is used as the communication protocol.

Each ECU 1a-1g sends and receives data in a unit of data called a "frame". The frame according to the CAN protocol has a predetermined format as shown in FIG. 2, which has an SOF field representing a start of the frame, an arbitration field for storing an ID that identifies the frame, a control filed for storing a data length and so on, a data field for storing data to be transferred, a CRC field for an error check, an ACK field used for notifying that the ECU has received data, and an EOF field representing an end of the frame.

Here, the ID (identifier) stored in the arbitration filed of the frame is set for each kind of frame, and used for identifying data contents and a sender ECU. The ID also represents a number that determines a priority for arbitration in data communication. In this embodiment, as the value of the identifier is smaller, the data has a higher priority.

The gateway apparatus 10 is configured to, in response to a receipt of a frame of data from one network, confirm an identifier from the received frame and send the frame to another network according to a predetermined routing map.

Figure 3:
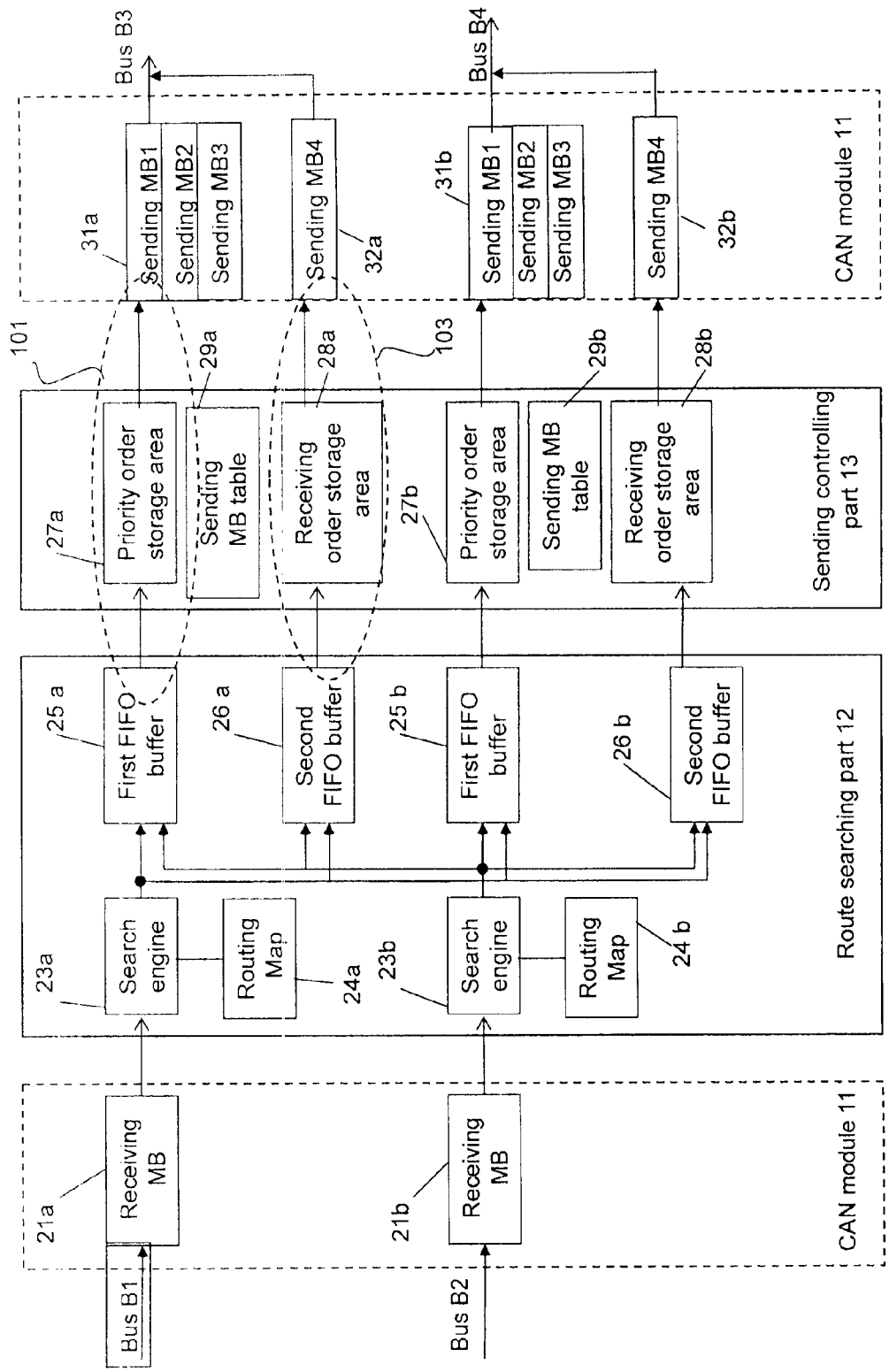
FIG. 3 schematically shows a structure of a vehicle onboard gateway apparatus in accordance with one embodiment of the present invention.

FIG. 3 shows a block diagram for a structure of the gateway apparatus 10. In the following drawings and description, when an element is collectively called, the element will be denoted without subscript such as "a" and "b".

The gateway apparatus 10 comprises a CAN module 11, a route searching part 12, and a sending controlling part 13. In this example, input buses of a bus B1 and a bus B2 and output buses of a bus B3 and a bus B4 are connected to the gateway apparatus 10. In this embodiment, the CAN module 11 and the route searching part 12 are implemented with hardware.

The sending controlling part 13 is implemented with software or by executing one or more programs stored in a storage such as a memory by the CPU (central processing unit) of the gateway apparatus 10.

The CAN module 11 is configured to perform a receiving and sending control of a frame of data from and to the bus according to the CAN protocol. In the CAN module 11, a receiving message box (MB) 21 for each channel of the input bus and sending message boxes (MB) 31 and 32 for each channel of the output bus are previously provided in a form of, for example, registers. The CAN module 11 has a function for temporarily storing a frame of data received from the input bus in the receiving MB 21 while sending a frame of data temporarily stored in the first sending MB 31 or the second sending MB 32 to the output bus in the order of priority.

In this embodiment, the number of the receiving MB 21 used for each channel of the input bus is one. The number of the first sending MB 31 used for each channel of the output bus is preferably less than the number of the IDs (that is, the number of priorities), and three of a sending MB1, a sending MB2 and a sending MB3 in this embodiment. Therefore, three frames can be stored at a time. On the other hand, the second sending MB 32 used for each channel of the output bus consists of a single sending MB4. A difference between the first sending MB31 and the second sending MB32 will be described later.

In the example of the figure, a receiving MB 21*a* for temporarily storing a frame of data received by the gateway apparatus 10 from the bus B1, a receiving MB 21*b* for temporarily storing a frame of data received by the gateway apparatus 10 from the bus B2, a first sending MB 31*a* (including three MBs of MB1 through MB3) and a second sending MB 32*a* (including one sending MB4) for temporarily storing a frame of data sent by the gateway apparatus 10 to the bus B3, and a first sending MB 31*b* (including three MBs of MB1 through MB3) and a second sending MB 32*b* (including one sending MB4) for temporarily storing a frame of data sent by the gateway apparatus 10 to the bus B4.

The CAN module 11 can be implemented with hardware as described above (for example, a module for performing the CAN communication, which is currently on the market, can be utilized). Alternatively, the CAN module 11 may be configured with software. The present invention utilizes functions of an existing CAN module to control sending of data to the first and second sending message boxes 31 and 32 by the sending controlling part 13 such that data is outputted to the bus in the order of priority in one hand and in the order in which data is received in the other hand.

The route searching part 12 comprises a search engine 23, a first FIFO buffer 25, and a second FIFO buffer 26. More specifically, the search engine 23 is provided corresponding to each input bus. A routing map 24 is pre-stored in a memory such as a RAM in association with each search engine 23. The first FIFO buffer 25 and the second FIFO buffer 26 are provided corresponding to each output bus. Each FIFO buffer has a predetermined number of stages (for example, 32 stages). One frame can be stored in each stage.

In this example, a search engine 23*a* is provided corresponding to the input bus B1, and a search engine 23*b* is provided corresponding to the input bus B2. A routing map 24*a* is associated with the search engine 23*a*, and a routing map 24*b* is associated with the search engine 23*b*. Both the routing maps 24*a* and 24*b* may be identical. A first FIFO buffer 25*a* and a second FIFO buffer 26*a* are provided corresponding to the output bus B3, and a first FIFO buffer 25*b* and a second FIFO buffer 26*b* are provided corresponding to the output bus B4.

Frames of data from a corresponding bus are serially stored in the receiving MB 21. The search engine 23 reads a frame from the receiving MB 21 at a predetermined timing and refers to the routing map 24 stored in a memory such as a RAM based on an identifier of the frame to determine a bus (channel) and a FIFO buffer to which the frame is to be transferred.

Here, referring to FIG. 4, one example of the routing map 24 is schematically shown. The routing map 24 has an ID field that defines an identifier, a receiving bus field that defines a channel number of a receiving bus (input bus), a sending bus field that defines a channel number of a sending bus (output bus), and a destination FIFO field that defines a number of a destination FIFO. Thus, the routing map 24 defines a bus from which data is received and a bus to which the data is sent for each ID. In this embodiment, the destination FIFO field has a value for differentiating between the first FIFO buffer 25 and the second FIFO buffer 26 (in the example of the figure, a value of 1 is set for the first FIFO buffer 25, and a value of 2 is set for the second FIFO buffer 26). Therefore, an output bus and a FIFO buffer are identified by the channel number of the sending bus and the number of the destination FIFO. Preferably, the routing map 24 is arranged in ascending numeric order of the ID, that is, from a higher priority to a lower priority.

Furthermore, in this embodiment, the routing map 24 has a label field. A correspondence between the label and the identifier is 1:1. The value of the identifier is uniquely derived from the value of the label and vice versa. The number of bits of the label is less than the number of bits of the ID. In a case of a standard frame of the CAN protocol, the ID has 11 bits. Therefore, the label has the number of bits less than 11 bits. The label values are arranged in ascending numeric order according to ascending ID values. As described above, in this embodiment, because the priority is lower as the ID value is higher, the priority is lower as the label value is higher. Priorities are indicated by IDs numbered in consecutive order, and hence the number of the priorities actually used is less than $2^{11}$. Thus, the number of bits of the label value can be established in such a manner as to correspond to the number of priorities (IDs) actually used. Because the label value is used as an entry number for a priority order storage area 27 that has an array structure as described later, the label values are established in such a manner as to have consecutive numbers.

The search engine 23 compares the ID of a frame of received data with IDs stored in the routing map 24, searches an ID matching the ID of the received frame, and obtains a label, a number of the destination FIFO, and a channel number of the sending bus (which may be multiple) for the searched ID. Because the routing map 24 is arranged according to ascending order of the ID, the comparison is preferably performed according to ascending order of the ID. In doing so, as the priority of the received frame is higher, the matched ID can be more quickly found, thereby shortening the time required for the search process.

The search engine 23 adds the obtained label to the received frame, and stores the frame with label in either one of the identified first FIFO buffer 25 and second FIFO buffer 26 corresponding to the obtained channel number of the sending bus. For example, in the routing map shown in FIG. 4, if the search engine 23 receives a frame of data having the ID of 300, the search engine 23 sends it to the first FIFO buffer 25 of a corresponding bus (channel number is F3). If the search engine 23 receives a frame of data having the ID of 500, the search engine 23 sends it to the second FIFO buffer 26 of a corresponding bus (channel number is F3).

In this embodiment, the label is added to data to be sent to any one of the first and second FIFO buffers 25 and 26. As described later, the label may not be added to data to be sent to the second FIFO buffer 26. Therefore, in a case where the value of the destination FIFO field indicates the second FIFO buffer 26 in the routing map 24, a value may not be set in the corresponding label field.

In this embodiment, because the search engine 23 is provided corresponding to each input bus, the route searching process can be performed in parallel for frames from all the input buses. Alternatively, only one search engine 23 may be provided for a plurality of bus channels. In this case, the search engine 23 searches routes for frames from both the receiving MBs 21a and 21b. A selector for controlling sending of a frame to the search engine 23 may be provided between the receiving MBs 21a/21b and the search engine 23. Such an embodiment is described in Japanese Patent Publication Laid-Open (JP-A) No. 2006-333438. As described above, the search engine 23 may be implemented with hardware as shown in this publication. Alternatively, the search engine 23 may be implemented with software.

Referring back to FIG. 3, a priority order storage area 27 and a receiving order storage area 28 (which may be collectively called buffer means) are provided for each channel of the output bus in the sending controlling part 13. These storage areas are implemented in a memory such as a RAM. In the example of the figure, a priority order storage area 27a, a receiving order storage area 28a, and a sending MB table 29a are provided for the output bus B3. A priority order storage area 27b, a receiving order storage area 28b, and a sending MB table 29b are provided for the output bus B4.

Here, referring to FIG. 5(a), a structure of the priority order storage area 27 is shown. The priority order storage area 27 has an array structure having entries. The number of entries is equal to the number of priorities (that is, the number of label values (ID values)). Each entry number corresponds to the label value. These entries are arranged according to the order of priority, that is, according to ascending label values. For example, assuming that the label value ranges from 1 to 10, entry areas for the numbers of 1 through 10 are previously set in the priority order storage area 27.

Furthermore, the priority order storage area 27 has a data field, a receiving flag field, and a sending MB field for each entry (label value). The data field is an area for storing a frame of data received from the corresponding first FIFO buffer 25. The receiving flag field is a field in which a receiving flag is set. An initial value (default value) of the receiving flag field is zero. When a frame of data from the first FIFO buffer 25 is stored in the priority order storage area 27, the value of one is set in the receiving flag field. The sending MB field is a field in which a number of the sending MB is set. An initial value (default value) of the sending MB field is zero. When a corresponding frame of data is stored (copied) in any one of the sending MB1 through MB3 of the first sending MB 31, a number of the sending MB in which it is stored is set in the sending MB field. In this embodiment, because there are three sending MBs in the sending MB31, the value of 1 is set if the frame is stored in the sending MB1. The value of 2 is set if the frame is stored in the sending MB2. The value of 3 is set if the frame is stored in the sending MB3.

FIG. 5(b) shows a structure of the sending MB table 29. The sending MB table 29 is used together with the priority order storage area 27. The sending MB table 29 has fields, which number is equal to the number of sending MBs provided in the first sending MB31. In this embodiment, because there are three sending MBs of MB1 through MB3, there are a MB1 field, a MB2 field, and a MB3 field. In the MB1 field, the label value of the frame of data currently stored in the sending MB1 is set. This holds true for the MB2 and MB3 fields. By referring to the sending MB table 29, a label value of a frame of data set (stored) in each sending MB can be identified.

FIG. 5(c) shows a structure of the receiving order storage area 28, which is a FIFO buffer having a predetermined number of stages (for example, 32 stages). One frame of data can be stored in each stage. Because the receiving order storage area 28 is a FIFO buffer, frames of data received from the corresponding second FIFO buffer 26 are stored in the order in which the frames are received, and the frames of data from the receiving order storage area 28 are outputted in the order in which the frames are received.

Referring back to FIG. 3, the sending controlling part 13 performs, for each output bus, a priority order sending control for transferring data in the order of priority and a receiving order sending control for transferring data in the order in which the data is received, in parallel. A first processing route shown by reference numeral 101, which provides components used for the priority order sending control, comprises the first FIFO buffer 25, the priority order storage area 27, the sending MB table 29, and the first sending MB 31. A second processing route shown by reference numeral 103, which provides components used for the receiving order sending control, comprises the second FIFO buffer 26, the receiving order storage area 28, and the second sending MB 32. The first and second processing routes are separate, and do not interfere with each other. Although the first and second processing routes 101 and 103 are shown by dotted lines only for the output bus B3 in the figure, a similar structure is also applied to the output bus B4.

A summary of an operation of the sending controlling part 13 for the output bus B3 will be described. The sending controlling part 13 temporarily stores a frame of data from the first FIFO buffer 25a into an entry area corresponding to a label value of the frame in the priority order storage area 27a. The sending controlling part 13 uses the sending MB table 29a to perform the priority order sending control for data from the priority order storage area 27a to the first sending MB 31a.

On the other hand, the sending controlling part 13 temporarily stores a frame of data from the second FIFO buffer 26a into the receiving order storage area 28a. The sending controlling part 13 performs the receiving order sending control for data from the receiving order storage area 28a to the second sending MB 32a.

The CAN module 11 sends frames of data stored in the MB1 through MB3 of the first sending MB 31a and the MB4 of the second sending MB32a to the corresponding bus B3 in the order of priority.

The above controls are performed in parallel between output buses. Therefore, a control for the output bus B4 that uses the priority order storage area 27b, the receiving order storage area 28b, the sending MB table 29b, the first sending MB31b, and the second sending MB32B is performed in parallel with the control for the output bus B3.

In the following, the priority order sending control will be described, and then the receiving order sending control will be described. As to the priority order sending control, 1) a case where the priority of an ID of data received in the priority order storage area 27 is higher than an ID of data stored in any sending MB of the first sending MB 31, and
2) a case where the priority of an ID of data received in the priority order storage area 27 is equal to an ID of data stored in any sending MB of the first sending MB 31, are specifically described. As to the former case 1), the description is made referring to FIGS. 6 through 9. As to the latter case 2), the description is made referring to FIG. 10.

Referring to FIGS. 6 through 9, an operation of the priority order sending control of the above case 1) performed by the sending controlling part 13 will be described. Here, let ID values corresponding to label values of 1 through 4 be 100, 110, 200 and 300, respectively. In the figure, a frame of data is represented by its ID value for the purpose of simplicity.

Figure 6:
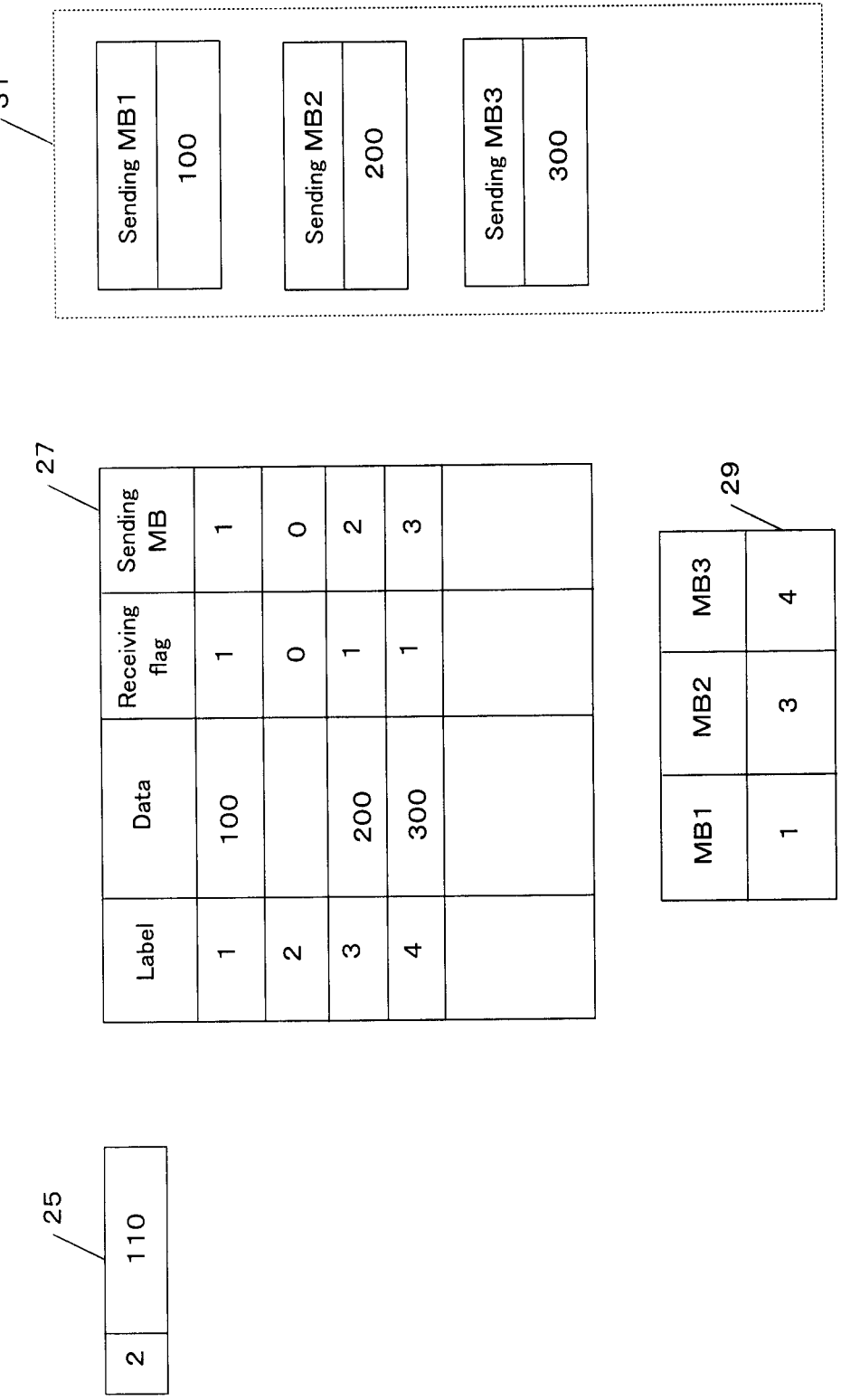
FIG. 6 is a diagram for explaining an operation of a sending control according to a priority order in accordance with one embodiment of the present invention.

FIG. 6 shows a state at a certain time. It is shown that a frame of data having the ID value of 110 assigned the label value of 2 (which is called ID110, hereinafter) is stored in the first FIFO buffer 25 (as described above, although the FIFO buffer has a predetermined number of stages, only a stage in which the frame of ID110 is stored is shown for the purpose of simplicity in the figure).

In the priority order storage area 27, a frame of data of ID100 is stored in an entry area for the label value of 1, a frame of data of ID200 is stored in an entry area for the label value of 3, and a frame of data of ID300 is stored in an entry area for the label value of 4. Because these frames have been transferred from the corresponding first FIFO buffer 25 to the priority order storage area 27, the value of 1 is stored in the corresponding receiving flag fields.

In the first sending message box (MB) 31, the frame of data of ID100 has been already set (stored) in the sending MB1, the frame of data of ID200 has been already set in the sending MB2, and the frame of data of ID300 has been already set in the sending MB3. Therefore, in the sending MB fields of the priority order storage area 27, a value of 1 indicating the sending MB1 is set for the entry area of the label value of 1, a value of 2 indicating the sending MB2 is set for the entry area of the label value of 3, and a value of 3 indicating the sending MB3 is set for the entry area of the label value of 4.

A data filed of the entry area of the label value of 2 in the priority order storage area 27 is empty. Therefore, the value in the receiving flag field is zero. In this example, although the value in the sending MB field is zero (initial value), a value other than zero may be set if sending of previously received data to the bus has been completed.

The label value 1 of the frame stored in the sending MB1 is set in the MB1 field of the sending MB table 29. Similarly, the value of 3 is set in the MB2 field, and the value of 4 is set in the MB3 field.

Figure 7:
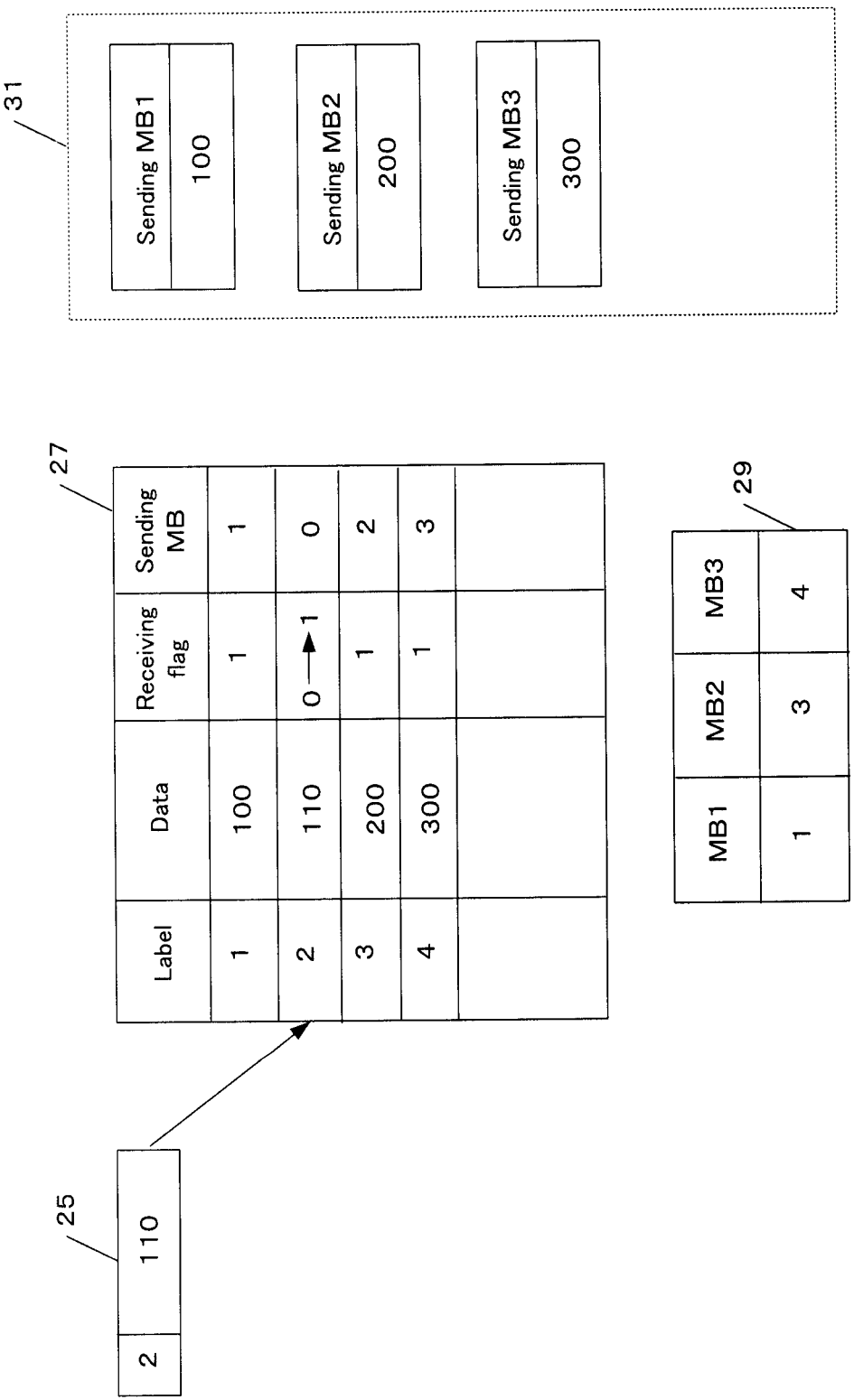
FIG. 7 is a diagram for explaining an operation of a sending control according to a priority order in accordance with one embodiment of the present invention.

FIG. 7 shows a state after a certain time has passed from the state of FIG. 6. The sending controlling part 13 reads a frame of data and a corresponding label value from the first FIFO buffer 25 and stores the frame in an entry area corresponding to the read label value in the priority order storage area 27. In this example, because the label value of the frame of data read from the first FIFO buffer 25 is 2, the frame of data of ID110 is stored in the entry area of the label value of 2. Together with this storing operation, the value in the receiving flag field of this entry is updated to one, and the value in the sending MB field of this entry is kept at zero (if a value other than zero has been set in the sending MB field, this value is cleared to zero).

Timing at which a frame of data is read from the first FIFO buffer 25 can be established by any appropriate means such that an overflow of the first FIFO buffer 25 is avoided. For example, in response to writing a predetermined number of frames into the FIFO buffer 25 by the search engine 23, an interruption signal is issued to the sending controlling part 13. In response to this, the sending controlling part 13 can serially read frames from the first FIFO buffer 25. One example of such a technique is described in Japanese Patent Publication Laid-Open (JP-A) No. 2006-333438.

Figure 8:
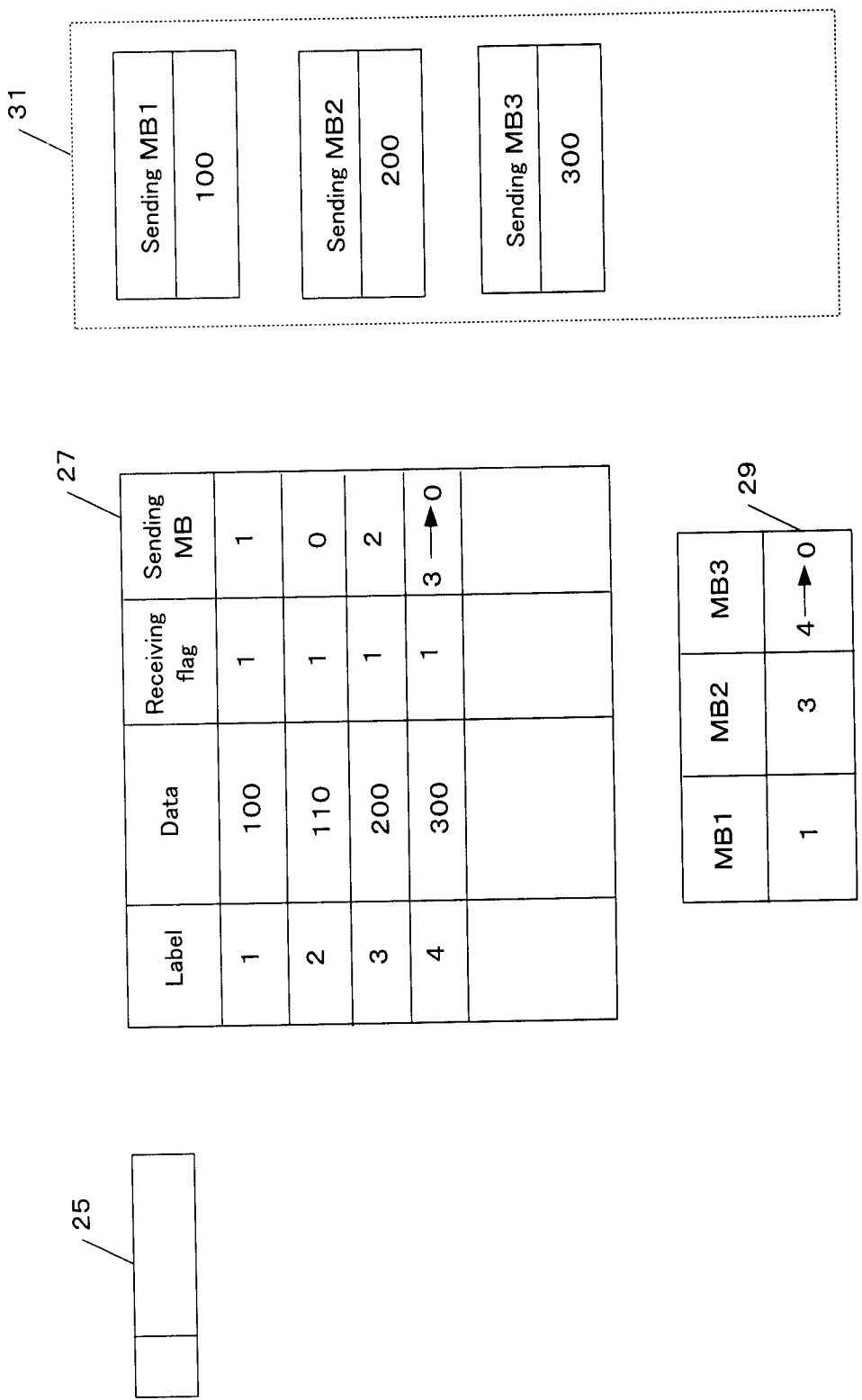
FIG. 8 is a diagram for explaining an operation of a sending control according to a priority order in accordance with one embodiment of the present invention.

FIG. 8 shows a state after a certain time has passed from the state of FIG. 7. Because the new frame of data of the label value of 2 has been received in the priority order storage area 27, the first FIFO buffer 25 is shown as being empty in the figure.

The sending controlling part 13 determines whether there is an empty in the first sending MB31 by examining whether there is a field in which zero is set in the sending MB table 29, while comparing the label value 2 of the new frame with the label values 1, 3, and 4 of the sending MB table 29. Such a comparison for the label value enables the priority to be compared between the ID of the new frame and the IDs of the frames that are present in the first sending MB31.

If there is an empty in the first sending MB 31 and a frame of data having the same priority (ID) is not present in the first sending MB31, then the new frame can be sent to an empty sending MB. However, in this example, there is no empty in the first sending MB31. Therefore, based on the above comparison for the label value, it is determined whether the ID of the new frame has a higher priority than the ID of any frame in the first sending MB31. If so, a sending MB in which a frame having a lowest priority is stored is selected from the sending MB1 through MB3.

In this example, the label value 2 of the new frame is less than the label values 3 and 4 set in the MB2 and MB3 fields of the sending MB table 29, and the label value 4 set in the MB3 field is greater than the label value 3 of the MB2 field. Therefore, the sending MB3 is selected as a sending MB in which a frame having a lower priority than the priority of the new frame and having the lowest priority is stored.

The sending controlling part 13 issues to the CAN module 11 a signal for requesting a stop of the sending process of the frame of ID300 that has been set in the sending MB3 thus selected to the bus. In response to this sending stop request signal, the CAN module 11 sends an acknowledge reply while performing the sending stop process of the frame in the sending MB3 (in the figure, the stop is represented by strikethrough text). When the stop is completed, a stop completion signal is replied to the sending controlling part 13.

When the stop completion signal is received, the sending controlling part 13 updates the value in the sending MB field of the entry of the label value of 4 in the priority order storage area 27 from 3 to zero, thereby indicating that the sending to the bus is not completed. The frame of the label value of 4 waits again to be sent to the first sending MB 31.

Furthermore, the sending controlling part 13 updates the value in the MB3 field of the sending MB table 29 from 4 to zero, thereby indicating that the sending MB3 has no frame or empty. Thus, when data having a higher priority is received, sending of data having a lower priority is stopped so as to forcefully make an empty sending MB.

The sending controlling part 13 cannot determine whether a frame from the sending MB is being actually sent to the bus or a frame in the sending MB waits to be sent to the bus. This is because the sending from the sending MB to the bus is controlled by the CAN module 11. When the CAN module 11 receives the sending stop request signal, the CAN module 11 performs the sending stop process if the sending MB that is requested for the sending stop is waiting for the sending. In contrast, the CAN module 11 does not perform the sending stop process when the sending is being performed. In this case, the CAN module 11 sends a signal indicating a negative acknowledge reply to the sending stop request signal. In response to the negative acknowledge reply signal, the sending controlling part 13 can select a sending MB in which there is a frame having a priority lower than the new frame and having the lowest priority other than the frame that was not stopped for the sending, and send again the sending stop request signal to the selected sending MB.

For example, in the above example, if the sending is being performed for the sending MB3, the sending MB table 29 can be referred to again to select the sending MB2 having the label value 3 that is greater than the label value 2 and is the greatest other than the label value 4 of the sending MB3 which was not stopped for the sending. The sending stop request signal can be issued again to the sending MB2.

Of course, if there is no sending MB that is stoppable and has a priority lower than the new frame (that is, if there is no sending MB having a frame that waits to be sent), the new frame waits for any sending MB to become empty while being kept in the priority order storage area 27.

Figure 9:
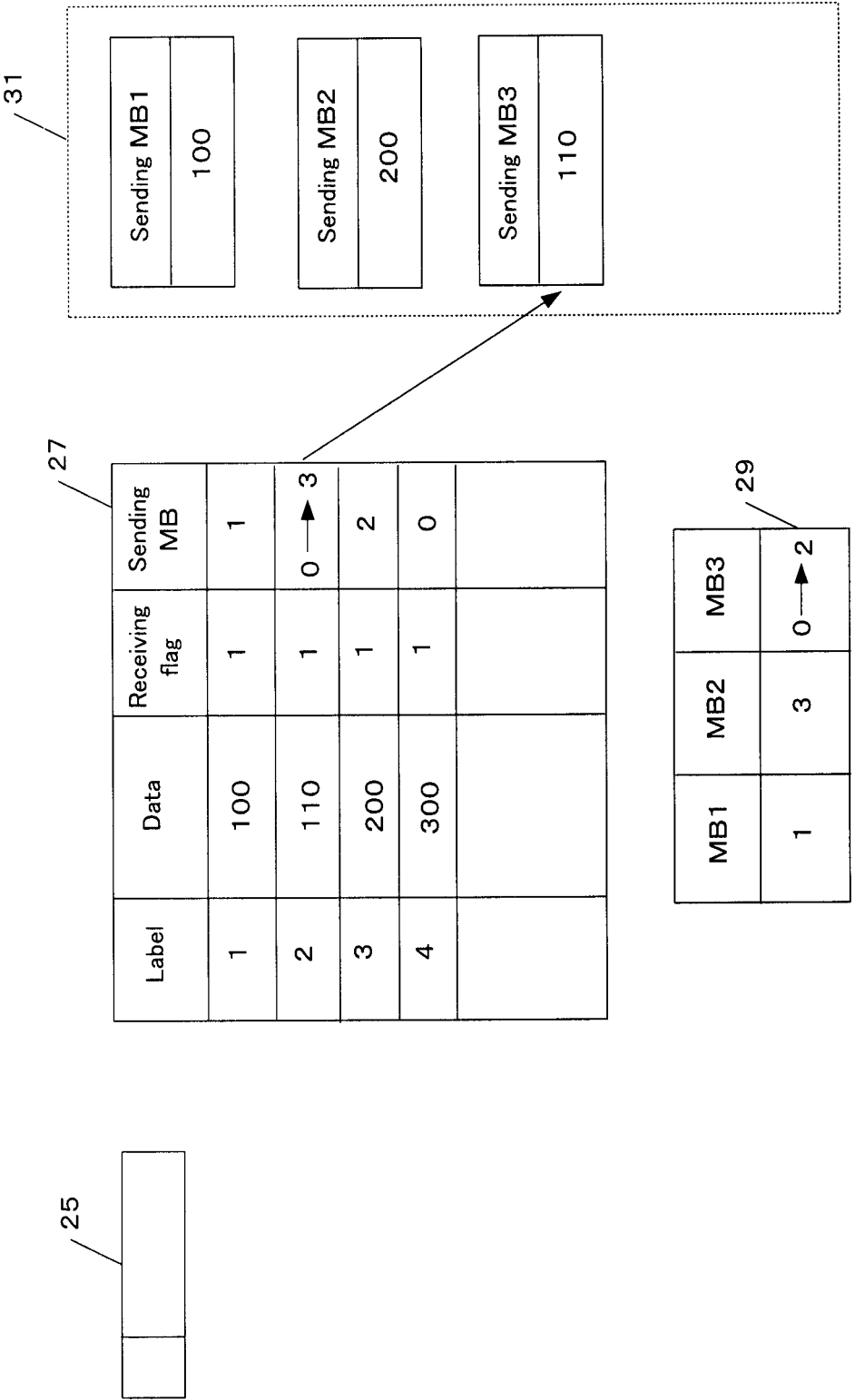
FIG. 9 is a diagram for explaining an operation of a sending control according to a priority order in accordance with one embodiment of the present invention.

FIG. 9 shows a state after a certain time has passed from the state of FIG. 8. Because zero was set in the MB3 field of the sending MB table 29, the sending controlling part 13 determines that an empty has been created in the sending MB3 and sets, in the sending MB3, the frame stored in the data field of the entry of the label value 2 in the priority order storage area 27 by copying (overwriting). The sending controlling part 13 updates the value in the sending MB field of the entry of the label value 2 in the priority order storage area 27 from zero to 3, thereby indicating that the frame of the label value 2 has been transferred to the sending MB3. The sending controlling part 13 updates the value in the MB3 field of the sending MB table 29 from zero to 2, thereby indicating that the frame of the label value 2 has been set in the sending MB3.

While the process by the sending controlling part 13 is being performed as shown in FIGS. 7 through 9, the CAN module 11 compares the IDs of the frames set in the MB1 through MB3 of the first sending MB31 and the MB4 of the second sending MB32 (which is described later) with each other to send (output) the frames to corresponding buses in the order of priority (ID). When the output to the bus is completed, the CAN module 11 issues a sending completion signal to the sending controlling part 13. The sending controlling part 13 deletes from the priority order storage area 27 the frame of the sending MB for which the sending is completed and clears to zero the value in the corresponding receiving flag field. Furthermore, the value in the MB field of the sending MB table 29 corresponding to the sending MB for which the sending is completed is cleared to zero. For example, if sending of a frame of data of ID100 in the sending MB1 to the bus is completed, the frame of ID100 is deleted from the data field of the entry area of the label value 1, the value of the receiving flag field is cleared to zero, and the value of the MB1 field of the sending MP table 29 is cleared to zero. Thus, the entry area of the label value 1 is made empty, and it is indicated that the sending MB1 is empty.

In this way, when data having a priority higher than data stored in the first sending MB is newly received, data having a lower priority that has been stored in the sending MB is replaced with the received new data. Therefore, it is prevented that data having a higher priority waits due to the occupation of the sending MB with data having a lower priority. As a result, data having a higher priority can be early outputted to the bus. Transfer to the bus can be implemented in such a manner as to follow the priority with high fidelity.

Furthermore, the transfer of a frame of data from the priority order storage area 27 to the sending MB31 is implemented by copying, and the frame is kept in the priority order storage area 27 until the output of the frame to the bus is completed. Therefore, the frame for which the sending is stopped by the sending stop process applied to the sending MB can wait to be set in the sending MB again.

In the priority order sending control by the sending controlling part 13, the determination of the priority is made by using the label. Any ID is not used. Therefore, the processing load can be reduced. Conventionally, the determination of the priority is made by comparing an ID of data newly received with IDs of data already received in the gateway apparatus. Because the ID has a large number of bits, the processing load may increase as the number of times of the comparison increases. In contrast, because the number of bits of the label is less than the ID, the processing load for the comparison process between the label values is less than the comparison process between the ID values.

The priority order storage area 27 has an array structure having entry numbers corresponding to ascending label values. Therefore, an area in which data is to be stored can be quickly identified in the priority order storage area 27 based on the label value assigned to the data from the first FIFO buffer 25. If such an array structure having entry numbers of the label values is not used, it is required to search a data area of an ID that is equal to the ID of the received data while comparing the ID of the received data with IDs of data present in the storage area 27. By using the array structure having entry numbers of the label values as described above, such comparison and search of the IDs are not required.

Furthermore, for data stored in the priority order storage area 27, sending of the data from the storage area 27 to the first sending MB31 is performed in the order of priority. Because the data is arranged in the storage area 27 according to ascending label values, that is, according to the priority order, the data to be sent can be quickly found.

Thus, by using the label, the time required until sending of data to the bus can be shortened. However, in another embodiment, the priority order sending control according to the present invention may be implemented by using the ID, without the label.

Figure 10:
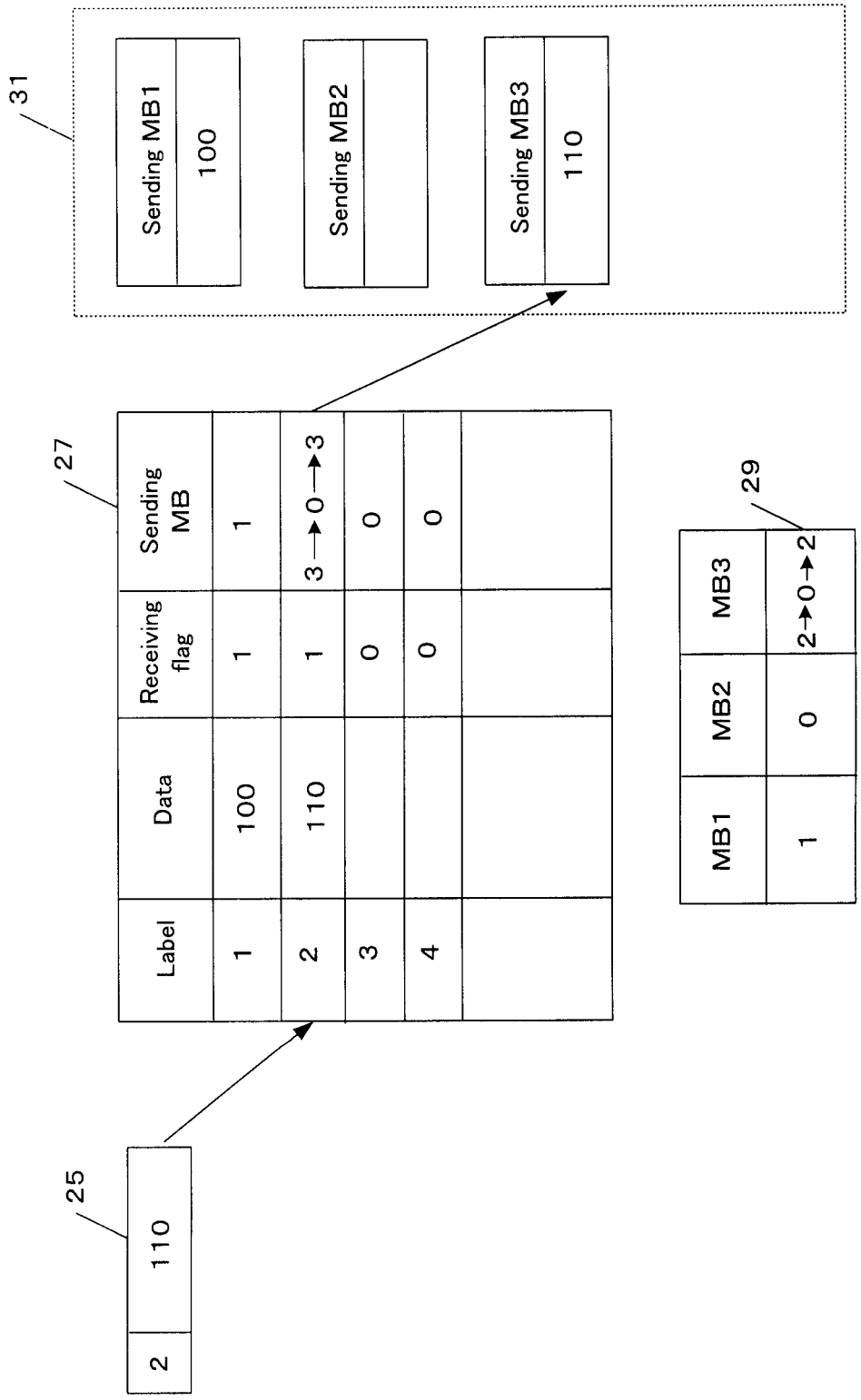
FIG. 10 is a diagram for explaining an operation of a sending control according to a priority order in accordance with one embodiment of the present invention.

Next, referring to FIG. 10, an operation of the priority order sending control in the above case 2) performed by the sending controlling part 13 will be described. The case 2) indicates a case where the priority of an ID of the received data is equal to the priority of an ID of data stored in any sending MB.

In this example, a frame of data of the label value 2 has been received in the first FIFO buffer 25. On the other hand, a frame of data of the same label value 2 has been already stored in the priority order storage area 27, which is the data currently set in the sending MB3 as shown by the value 3 in the sending MB field. Sending this frame of data in the priority order storage area 27 to the bus has not been completed. The value in the MB3 field of the sending MB table 29 is 2.

In such a case, the sending controlling part 13 reads the frame of the label value 2 from the first FIFO buffer 25 and stores it by overwriting in the entry area of the label value 2 in the priority order storage area 27. In response to this, the value in the receiving flag field of this entry area is kept at one, and the value in the sending MB field is cleared to zero.

Furthermore, the sending controlling part 13 compares the label value 2 of the new frame with the label values 1, 0, 2 of the frames already set in the sending MBs by referring to the sending MB table 29, to determine that the frame having the same ID as the new frame has been set in the sending MB3. In response to this determination, the sending controlling part 13 stops the sending for the sending MB3. As described above, the sending controlling part 13 issues the sending stop request signal to the sending MB3. The CAN module 11 sends an acknowledge reply and performs the sending stop process. When the stop of the sending is completed, the sending controlling part 13 updates the value in the sending MB field of the entry area of the label value 2 to zero while updating the value in the MB3 field of the sending MB table 29 to zero.

Thereafter, the sending controlling part 13 sets the frame of the label value 2 from the priority order storage area 27 to the sending MB3 by copying (overwriting). The sending controlling part 13 also updates the value in the sending MB field of the entry area of the label value 2 from zero to 3 while updating the value in the MB3 field of the sending MB table 29 from zero to 2.

Although not shown in the figure, when the sending of the frame of the label value 2 set in the sending MB3 to the bus is completed, this frame is deleted from the priority order storage area 27. The receiving flag field is cleared to zero. The MB3 field of the sending MB table 29 is cleared to zero.

Thus, when a frame having the same ID as a frame stored in a sending MB is received, the corresponding entry area of the priority order storage area 27 is overwritten and this sending MB is also overwritten even if there is another empty sending MB (in the figure, the sending MB2 is empty).

If the CAN module 11 sends a negative acknowledge in response to the sending stop request signal from the sending controlling part 13, the frame of the label value 2 in the priority order storage area 27 waits to be transferred to any sending MB according to the control process as described referring to FIGS. 6 through 9.

Figure 11:
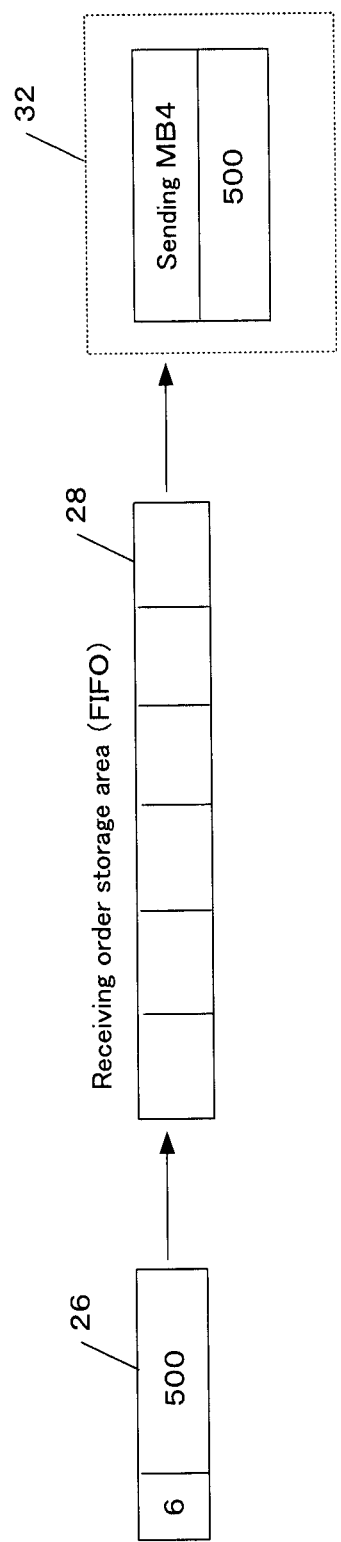
FIG. 11 is a diagram for explaining an operation of a sending control according to a receiving order in accordance with one embodiment of the present invention.

Next, referring to FIG. 11, the receiving order sending control performed by the sending controlling part 13 will be described.

A frame of data of ID500 assigned the label value 6 has been stored in the second FIFO buffer 26. The sending controlling part 13 reads a frame of data one by one from the second FIFO buffer 26 and then stores it in the receiving order storage area 28.

As described above, data stored in the second FIFO buffer 26 may not be assigned a label. Furthermore, even for data assigned a label, when the data is stored in the receiving order storage area 28, it is not required to read out the label. Data without a label can be stored in the receiving order storage area 28.

Timing at which a frame of data is read out from the second FIFO buffer 26 can be established by any appropriate means such that an overflow of the second FIFO buffer 26 is avoided in a similar way to the first FIFO buffer 25.

The sending controlling part 13 reads out a frame of data one by one from the receiving order storage area 28 in response to an occurrence of an empty in the sending MB4 of the corresponding second sending MB 32, and then stores (copies) the read frame into the sending MB4. As described above, the receiving order storage area 28 is configured as a FIFO buffer. Therefore, according to the order in which data is read from the second FIFO buffer 26, the data is stored in the receiving order storage area 28. Then, according to the order in which data is read from the receiving order storage area 28, the data is stored in the sending MB4. Thus, data can be transferred to the sending MB4 without disturbing the order in which the data is received in the second FIFO buffer 26.

As described above, the CAN module 11 compares the IDs of the frames in the sending MB1, MB2, MB3 and MB4 to send the frames to the output bus in the order of priority. When sending of the frame of data stored in the sending MB4 to the output bus is completed, the CAN module 11 issues a sending completion signal to the sending controlling part 13. In response to the sending completion signal, the sending controlling part 13 determines that an empty is created in the sending MB4, reads out a next frame of data from the receiving order storage area 28 and stores it in the sending MB4 by overwriting.

Figure 12:
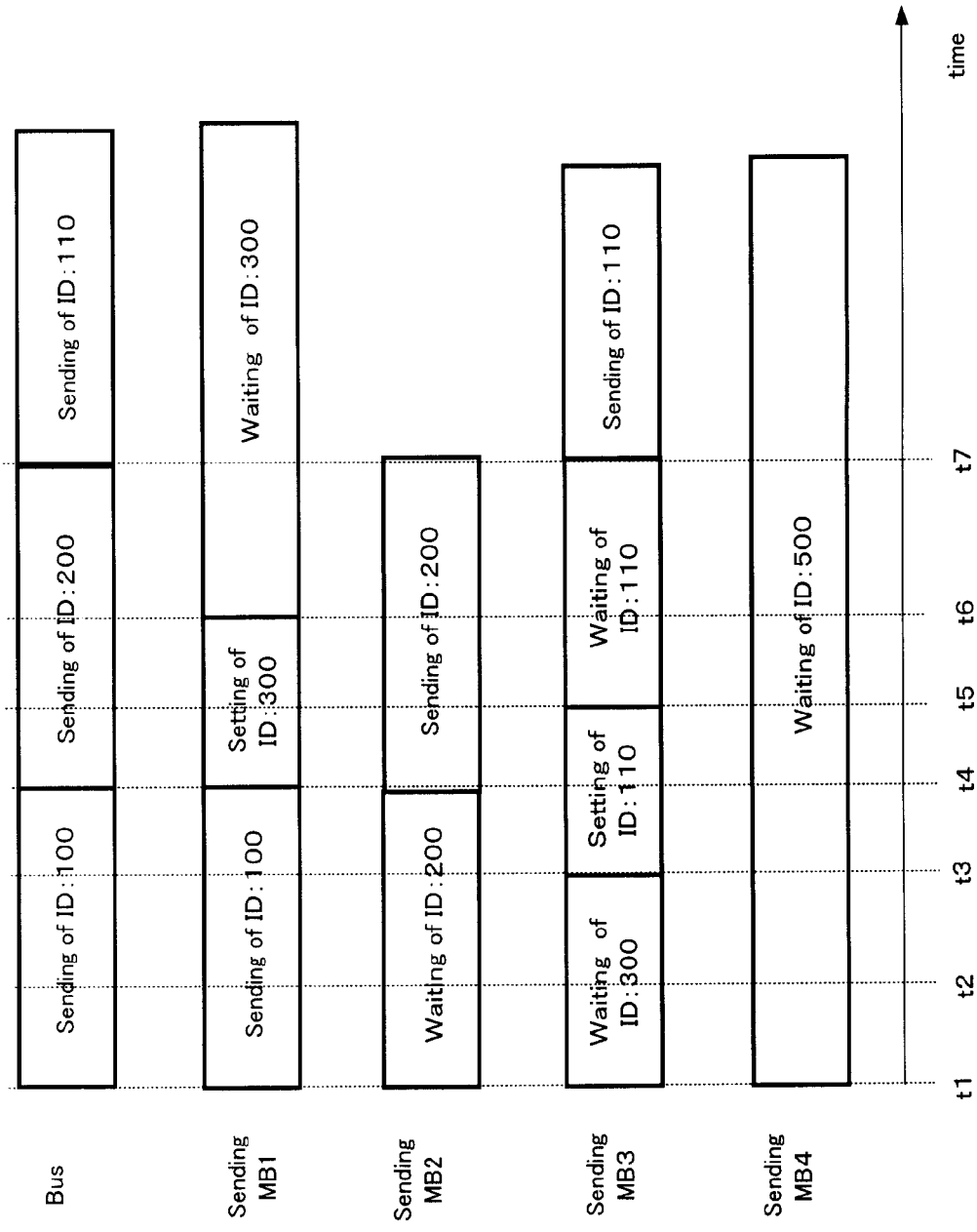
FIG. 12 is a diagram for explaining a form of sending data from a sending message box to a bus in accordance with one embodiment of the present invention.

Next, referring to FIG. 12, one embodiment for sending (outputting) a frame of data to the bus from each sending MB will be described.

At time t1, a frame of data of ID100, a frame of data of ID200, a frame of data of ID300, and a frame of data of ID500 have been already stored in the sending MB1, MB2, MB3, and MB4, respectively. ID100 has a higher priority than the other IDs. Therefore, at time t1, sending of the frame of ID100 to the bus is started. The frames of ID200 in the sending MB2, ID300 in the sending MB3, and ID500 in the sending MB4 wait to be sent.

At time t2, it is assumed that the priority order sending control by the sending controlling part 13 as described above issues a sending stop request signal to the sending MB3 from the sending controlling part 13. Here, the frame of ID500 in the sending MB4 has a lower priority than the frame of ID300 in the sending MB3. However, because the sending MB4 is not controlled by the priority order sending control, the sending stop request signal is issued to the sending MB3.

In response to this, the CAN module 11 sends an acknowledge reply to the sending controlling part 13. The CAN module 11 cancels the waiting state of the sending MB3 and performs a predetermined stop process. If the stop process is completed, the CAN module 11 replies a stop completion signal to the sending controlling part 13. In response to the stop completion signal, the sending controlling part 13 starts sending the frame of ID110 from the priority order storage area 27 to the sending MB3 at time t3. As a result, the frame of ID300 in the sending MB3 is overwritten, which continues until the time t5.

On the other hand, at time t4, sending of the frame of ID100 to the bus is completed. In response to this completion, the CAN module 11 compares the priority of the frame of ID200 in the sending MB2 in the waiting state with the priority of the frame of ID500 in the sending MB4 in the waiting state. Because the priority of ID200 is higher than the priority of ID500, the CAN module 11 starts sending the frame of ID200 in the sending MB2 to the bus. Furthermore, a sending completion signal for the frame of ID100 is sent to the sending controlling part 13. In response to this, the sending controlling part 13 starts sending a new frame of ID300 to the sending MB1. Setting of the frame of ID300 in the sending MB1 (which is implemented by overwriting) continues until the time t6.

As seen from the figure, at time t4 at which sending of the frame of ID100 to the bus is completed, sending of the frame in the sending MB2 to the bus can be immediately started, although a new frame of data is being set in the sending MB3 by the priority order sending control. Therefore, even when one sending MB is being set by the priority order sending control, sending a frame from the remaining one sending MB to the bus can be continuously performed.

At time t5, because setting (storing) the frame of ID110 in the sending MB3 is completed, the sending MB3 enters a waiting state because the frame of ID200 is being sent to the bus. At time t6, because setting the frame of ID300 in the sending MB1 is completed, the sending MB1 enters a waiting state because the frame of ID200 is being sent to the bus. Sending the frame of ID200 is completed at time t7. The frames of ID500, ID300, and ID110 are waiting to be sent. The CAN module 11 compares these IDs to select a frame having a highest priority, or the frame of ID110, and sends it to the bus. The waiting state of the frames of ID300 and ID500 is continued.

Thus, in a case where the number of the sending MBs used is equal to or greater than three (in the example of FIG. 12, four of MB1 through MB4), even if a sending MB makes a transition from a waiting state in which data waits to be sent to a setting state in which data is being set (stored) by the priority order sending control, a frame of data from another sending MB in the waiting state can be sent to the bus. Such continuous sending is difficult when the number of the sending MBs used is two. In a case where the number of the sending MBs is two, when a sending MB makes a transition to the setting state by the priority order sending control, two sending boxes may become in the setting state, during which the bus is idle and hence the performance may be reduced. Therefore, it is preferable to provide at least three sending MBs to be used.

It is more preferable to provide at least three of the first sending MBs used for the priority order sending control. As described above, different types of data may be handled between the priority order sending control and the receiving order sending control. Therefore, there may be a case where only the priority order sending control substantially operates. In order to implement the continuous sending in such a case, it is preferable that the number of the first sending MB31 is at least three as shown by MB1 through MB3 of FIG. 12.

On the other hand, even when the number of the first sending MBs used for the priority order sending control is equal to or greater than four, the above continuous sending can be implemented. However, because the number of MBs to be compared is increased when a sending MB in which data is to be replaced is determined, the processing load may increase. Such processing load increases with an increase of the number of the sending MBs used. Furthermore, the CAN module 11 selects a frame of data having an ID of a highest priority when starting sending data to the bus. In such a selection process, as the number of the sending MBs is increased, the number of IDs to be compared is increased, thereby increasing the processing load. Therefore, it is preferable that the number of the sending MBs used for the priority order sending control is just three from the viewpoint of the suppression of the processing load while keeping the continuous sending.

In the example of the figure, because the priority of data in the sending MB4 is low, the duration of the waiting state of this frame is relatively long. If the priority of data set in the sending MB4 is high, the frame would be early outputted to the bus. For example, if the ID of the frame set in the sending MB4 is 50, this frame would be sent to the bus at time t4 at which sending for the sending MB1 to the bus is completed. The CAN module 11 does not discriminate between data for the priority order sending control and data for the receiving order sending control. Therefore, the CAN module 11 controls the sending to the bus only based on the IDs of data in the sending MB1, MB2, MB3 and MB4.

In summary, in the first processing route (101 of FIG. 3) in which the priority order sending control is performed, data is set (stored) in the sending MB according to the priority of the data. On the other hand, in the second processing route (103 of FIG. 3), data is set in the sending MB according to the order in which the data is received (receiving order). The both processing routes are separate and do not interfere with each other. Therefore, sending to the bus according to the priority is ensured in the first processing route while ensuring sending to the bus according to the receiving order in the second processing route. Especially, in the priority order sending control according to this embodiment, data stored in the first sending MB31 may be replaced as described referring to FIGS. 6 through 10, and hence it is difficult to keep the receiving order in the first processing route. In the second processing route, such replacement does not occur, and hence sending according to the receiving order can be ensured.

Furthermore, as described above, data is classified between the first and second processing routes only based on the ID of the data. In the classification, a source of the data (a network through which the data is received, or an ECU from which the data is received) is not used or examined. Therefore, the processing load can be reduced. It can be easily determined based on the ID value whether the data is to be processed in the first or second processing route.

Here, as to the types of data to be processed in the first and second processing routes, some embodiments will be described.

In one embodiment, data to be processed in the second processing route in which the receiving order sending control is performed has a larger amount than data to be processed in the first processing route in which the priority order sending control is performed. That is, data having an amount that can be stored in a data field shown in FIG. 2 can be included in one frame, and such data that can be included in one frame is processed in the first processing route. For example, in a case of the CAN frame, the data field can store 0-8 bytes of data. Therefore, data having a length of 0-8 bytes is processed in the first processing route.

On the other hand, in the second processing route, data having an amount that cannot be transferred unless the data is divided into a plurality of frames is handled. For example, in a case of the CAN frame, 0-8 bytes of data can be transferred by one frame as described above. Data having a length longer than 8 bytes needs to be divided into a plurality of data blocks. Each data block is included in each frame. For example, when 15 bytes of data is transferred, at least two frames are required.

Therefore, the assignment of the ID to data is implemented such that the type of data having a length that can be transferred by one frame is processed in the first processing route while the type of data having a length that can be transferred by a plurality of frames is processed in the second processing route. The routing map 24 is created according to such assignment of the ID. In the second processing route, because the frames are transferred with the order of the frames being kept, the frames of data having a long length can be transferred from one network to another network without disturbing the order of the frames.

In another embodiment, data to be processed in the first processing route is control data used for controls of the vehicle performed periodically or in time intervals. Data to be processed in the second processing route is management data used for non-periodical management of the vehicle. The control data is generally used for controls executed by each ECU when the vehicle is traveling. For example, various controls such as an intake air amount control and a fuel amount control for an engine of the vehicle and a steering control are performed by corresponding ECUs at a high frequency (for example, predetermined time intervals) when the vehicle is traveling. These controls are performed based on the present operating state of the vehicle so as to implement the real time controls. For example, the operating state data such as the present throttle opening degree, the present fuel injection time, and the present steering angle is detected or determined at predetermined time intervals and used for the controls.

The length of such control data is generally designed to be stored in one frame (for the CAN, the length is equal to or less than 8 bytes). When the control data is being transferred, the control data can be overwritten such that the latest control data is transferred as described referring to FIG. 10. For example, when a control based on an engine rotational speed data is performed, it is preferable to use the latest engine rotational speed data. If old rotational speed data is being transferred and new rotational speed data has caught up the old data, then it is allowed that the old data is overwritten with the new data. Thus, the new data can be provided to a control process of the ECU while preventing the redundant transfer of the old data.

On the other hand, the management data is used for diagnosis and maintenance for the vehicle. As to data used for diagnosis, for example, there are log data (including history data) and test data for the diagnosis. For example, one or more ECUs have functions for, when the vehicle is traveling, accumulating logs for a history of data regarding the operating state, results of monitoring the operating state, records of the state of the vehicle when an abnormality or failure has occurred, and records of processes by computers (ECUs). While the vehicle is stopped, a predetermined external apparatus (diagnosis apparatus) is connected to the in-vehicle LAN to read the log data from the ECU(s) and check the contents of the log data. Further, in order to diagnose ECUs and each part of the vehicle via a particular ECU, a predetermined external apparatus (diagnosis apparatus) is connected to the in-vehicle LAN to send test data to the in-vehicle LAN and receive the resultant data from the in-vehicle LAN.

As data used for maintenance, there are computer programs executed by CPUs of ECUs and maps (tables) used by the programs, which are previously stored in non-volatile memories of the ECUs. There are various programs such as programs for controlling each part of the vehicle by the ECUs, and programs for notifying a user of information regarding the vehicle by the ECUs in an appropriate form (for example, display on a display apparatus and voice). Updating such programs and associated maps and newly storing in the non-volatile memories new programs and maps are performed. In such a case, a predetermined external apparatus (rewriting device) is connected to an ECU to be rewritten via the in-vehicle LAN to write in the non-volatile memory the updated programs and new programs. Without the external device, the updated and new programs may be obtained via, for example, a storage medium such as a CD or wireless communication, to write them into the non-volatile memory.

Although communication of such management data is infrequent, its data amount is larger than the control data. Therefore, the management data needs to be divided into a plurality of data blocks and the data blocks need to be serially transferred. If the order of transferring the data blocks is disturbed, the diagnosis and maintenance may be compromised. Therefore, the management data is transferred in the second processing route.

In yet another embodiment, a diagnosis network for connecting an external apparatus can be included in the in-vehicle LAN. The external apparatus can communicate with each ECU on the in-vehicle LAN through the diagnosis network. In such a case, data sent to and received from the diagnosis network is assigned a unique ID. The data assigned the unique ID is processed as the management data in the second processing route. Data other than the data assigned the unique ID is processed as the control data in the first processing route. Here, the external apparatus includes not only an apparatus for obtaining data for diagnosis from an ECU and loading data into an ECU, but also a rewriting device for rewriting programs and maps of an ECU for the maintenance.

In this way, the first and second processing routes are individually used according to the type of data. Therefore, data transfer that is appropriate for the type of data can be implemented. The discrimination between data processed in the first processing route and data processed in the second processing route as described in the above embodiments is one example. Of course, the ID may be assigned to data according to the nature of the data (that is, data to be transferred according to the priority order or data to be transferred according to the receiving order). Some of the above embodiments may be combined. For example, data communicated on the diagnosis network and data having an amount that cannot be included in one frame are assigned an ID to be processed in the second processing route, and the other data is assigned an ID to be processed in the first processing route. Of course, the routing map 24 is defined such that the IDs processed in the second processing route are sent to the second FIFO buffer 26 while the IDs processed in the first processing route are sent to the first FIFO buffer 25.

As described above, for a case where the control data is transferred on the first processing route and the management data is transferred on the second processing route, in one embodiment, when the management data is being transferred on the second processing route, this transfer is given a higher priority than the first processing route. That is, because transfer of the management data is for diagnosis and maintenance, this transfer is often implemented when the vehicle is stopped. On the other hand, although sending and receiving the control data are performed even when the vehicle is stopped (for example, a control signal is periodically sent and received among ECUs when the vehicle is stopped), the urgency of such control data is low because the vehicle is stopped. Therefore, when the vehicle is stopped, the transfer of the management data is given a higher priority, thereby shortening the time required for the diagnosis and(or) maintenance.

In this case, the management data is divided into a plurality of data blocks and then inserted in a plurality of frames having the same ID. These are serially stored in the receiving order storage area 28 and then serially stored in the sending MB4 by the receiving order sending control as described above. Until outputting all the plurality of frames to the bus is completed, the sending controlling part 13 can stop the priority order sending control such that sending for the first sending MB31 (MB1 through MB3) to the bus is stopped. In doing so, the transfer of the management data consisting of the plurality of data blocks can be given a higher priority and continuously implemented. For example, when a control program stored in a non-volatile memory of an ECU is rewritten with a new control program, the new control program can be transferred as continuous data blocks. Therefore, rewriting the program is early completed.

Timing at which the priority order sending control is stopped such that the receiving order sending control is given a higher priority can be arbitrarily determined. For example, this timing may be a time at which a frame is received in the receiving order storage area 28 and the vehicle speed is zero. The urgency of the control data is low because the vehicle is stopped, and hence an influence on the vehicle travel due to the transfer of the management data can be more surely avoided. Alternatively, for example, if the amount of the management data communicated during the vehicle travel is small and such amount does not influence the transfer of the control data, then the priority order sending control may be stopped in response to a receipt of a frame in the receiving order storage area 28. Furthermore, in response to a predetermined operation from a user (for example, an operation for inputting a predetermined signal to the gateway apparatus through a predetermined input part (external apparatus or predetermined switch)), the priority order sending control may be stopped.

More specifically, stopping and restarting the priority order sending control may be implemented by, for example, the following technique. As described above, the sending stop request signal is issued to the sending MB1 through MB3. The sending controlling part 13 stops the priority order sending control and performs only the receiving order sending control. The sending controlling part 13 serially sends frames, which are the management data, from the receiving order storage area 28 to the sending MB4. These frames are serially sent to the bus from the sending MB4 by the CAN module 11. Completion of sending the management data from the sending MB4 to the bus may be determined by any technique. For example, the sending controlling part 13 determines the completion of sending all the data blocks (management data), if the receiving order storage area 28 becomes empty (that is, no data is present in the FIFO) and the sending completion signal indicating the completion of sending for the sending MB4 is received. Then, the sending controlling part 13 restarts the priority order sending control.

Giving a higher priority to the receiving order sending control of the management data as described above may be performed intermittently. For example, the receiving order storage area 28 is structured by the FIFO having a predetermined number of stages (for example, 32 stages). Each time sending 32 frames stored in the FIFO to the bus is completed (this can be implemented by counting the number of data transfer to the sending MB4 and receiving the sending completion signal of the $32^{nd}$ data to the bus), giving a priority to the receiving order sending control is temporarily cancelled. For a predetermined time period during which such cancelling is performed, the priority order sending control is restarted. For the predetermined time period, the receiving order sending control may be performed or stopped (in the latter case, the sending controlling part 13 stops sending of data to the sending MB4). After the predetermined time period has elapsed, the priority order sending control is stopped again, and a priority is given to the sending of 32 frames stored in the receiving order storage area 28 to the bus. Such intermittent operation can early complete sending of the management data while preventing that sending of the control data to the bus is stopped for a long time.

Figure 13:
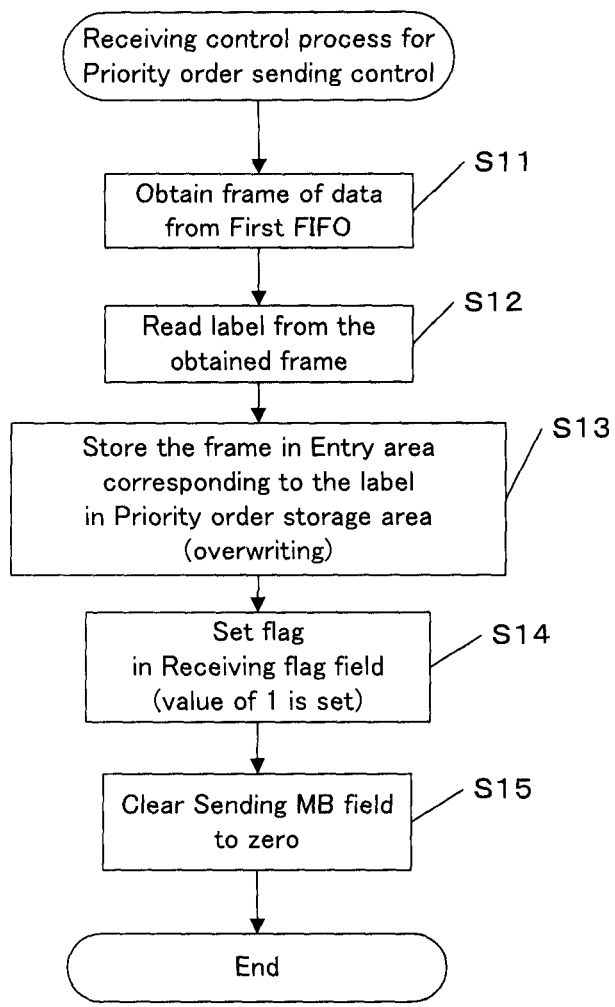
FIG. 13 shows a flowchart of a receiving control process according to a priority order in accordance with one embodiment of the present invention.

Next, FIG. 13 is a flowchart of a control process for receiving a frame of data from the first FIFO buffer 25 to the priority order storage area 27, performed by the sending controlling part 13. This process is started in response to, for example, a receipt of an interruption signal from the search engine 23 as described above.

In step S11, a frame of data is obtained from the first FIFO buffer 25. As described above, a label corresponding to an ID of the frame has been already obtained by searching the routing map 24 and assigned to the frame of data.

In step S12, the label assigned to the obtained frame is read. In step S13, the frame is stored in an entry area corresponding to the label in the priority order storage area 27. As described above, when another frame has been already stored in the entry area, it is overwritten with the above obtained frame.

In step S14, a value of 1 is set in the receiving flag field of the entry area. In step S15, the value of the sending MB field of the entry area is cleared to zero. Thus, the new frame is stored in the storage area 27 as shown in FIG. 7.

Figure 14:
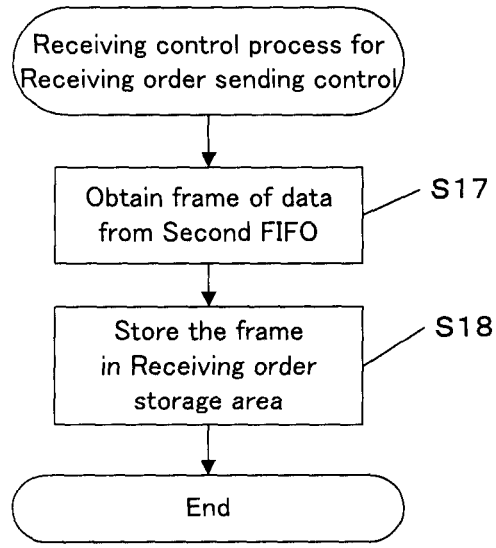
FIG. 14 shows a flowchart of a receiving control process according to a receiving order in accordance with one embodiment of the present invention.

FIG. 14 is a flowchart of a control process for receiving a frame of data from the second FIFO buffer 26 to the receiving order storage area 28, which is performed by the sending controlling part 13. This process is started in response to, for example, a receipt of an interruption signal from the search engine 23 as described above.

In step S17, a frame of data is obtained from the second FIFO buffer 26. In step S18, the obtained frame is stored in the receiving order storage area 28.

The processes of FIGS. 13 and 14 may be performed in parallel.

Figure 15A:
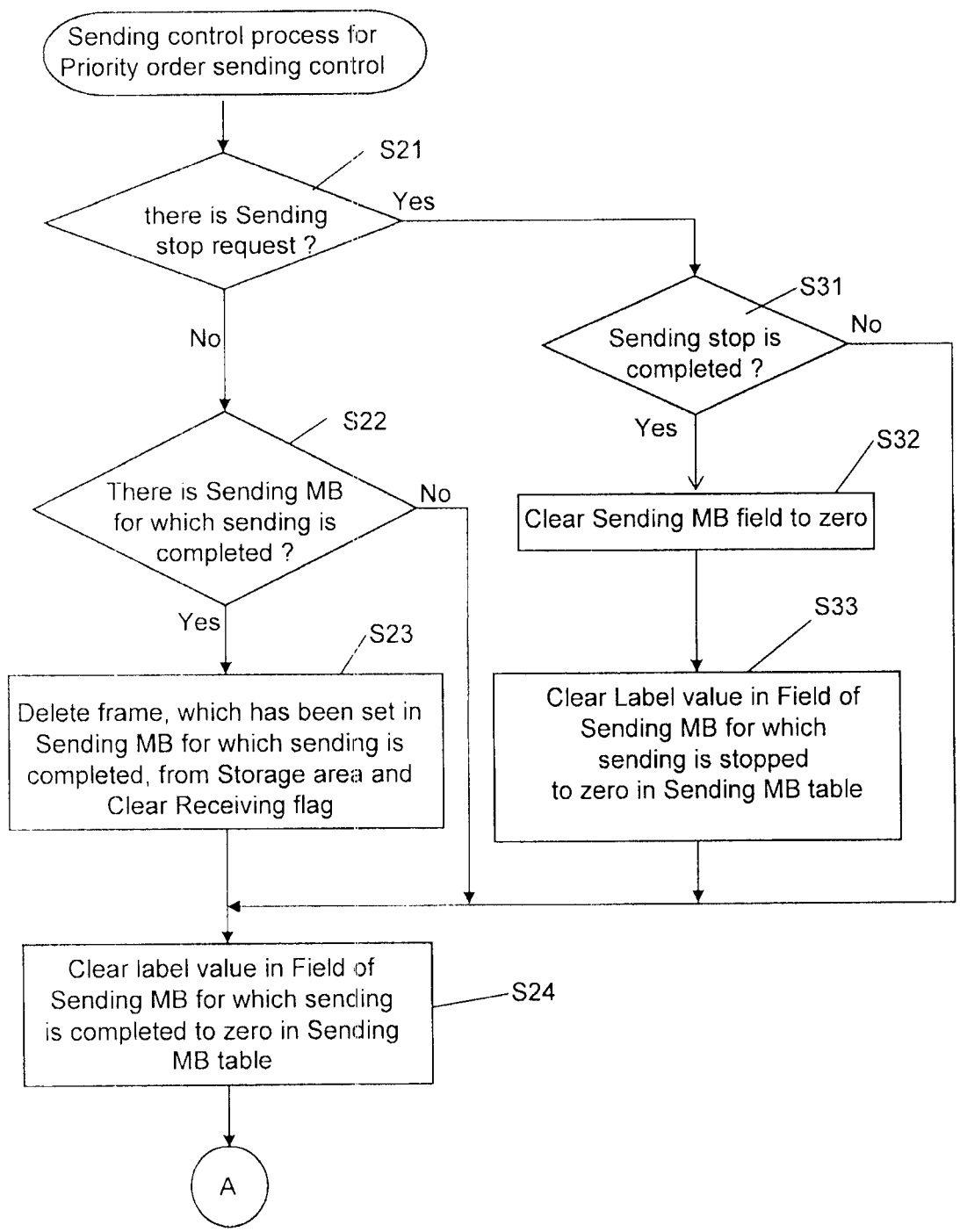
FIG. 15 shows a flowchart of a sending control process according to a priority order in accordance with one embodiment of the present invention.
Figure 15B:
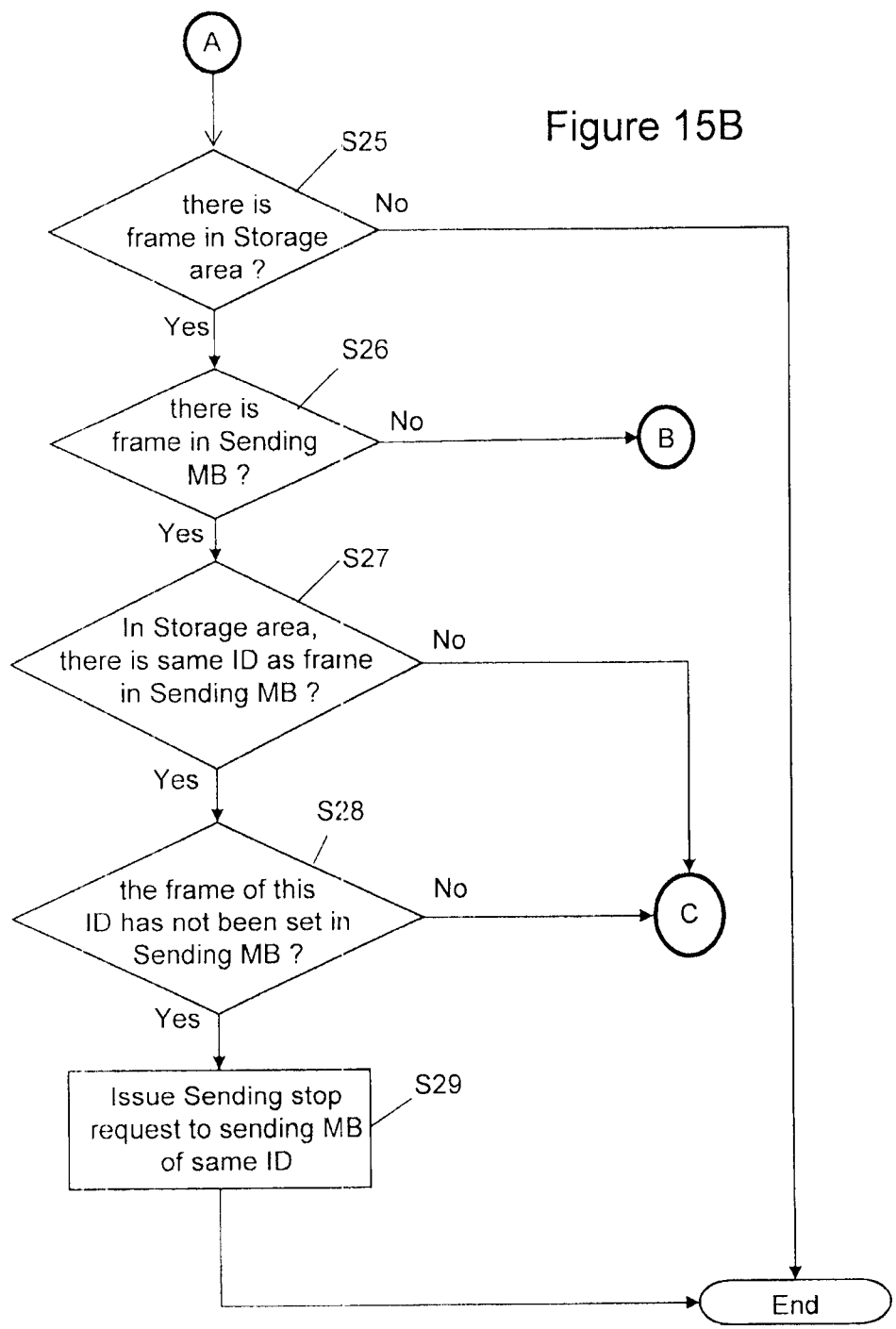
Figure 15C:
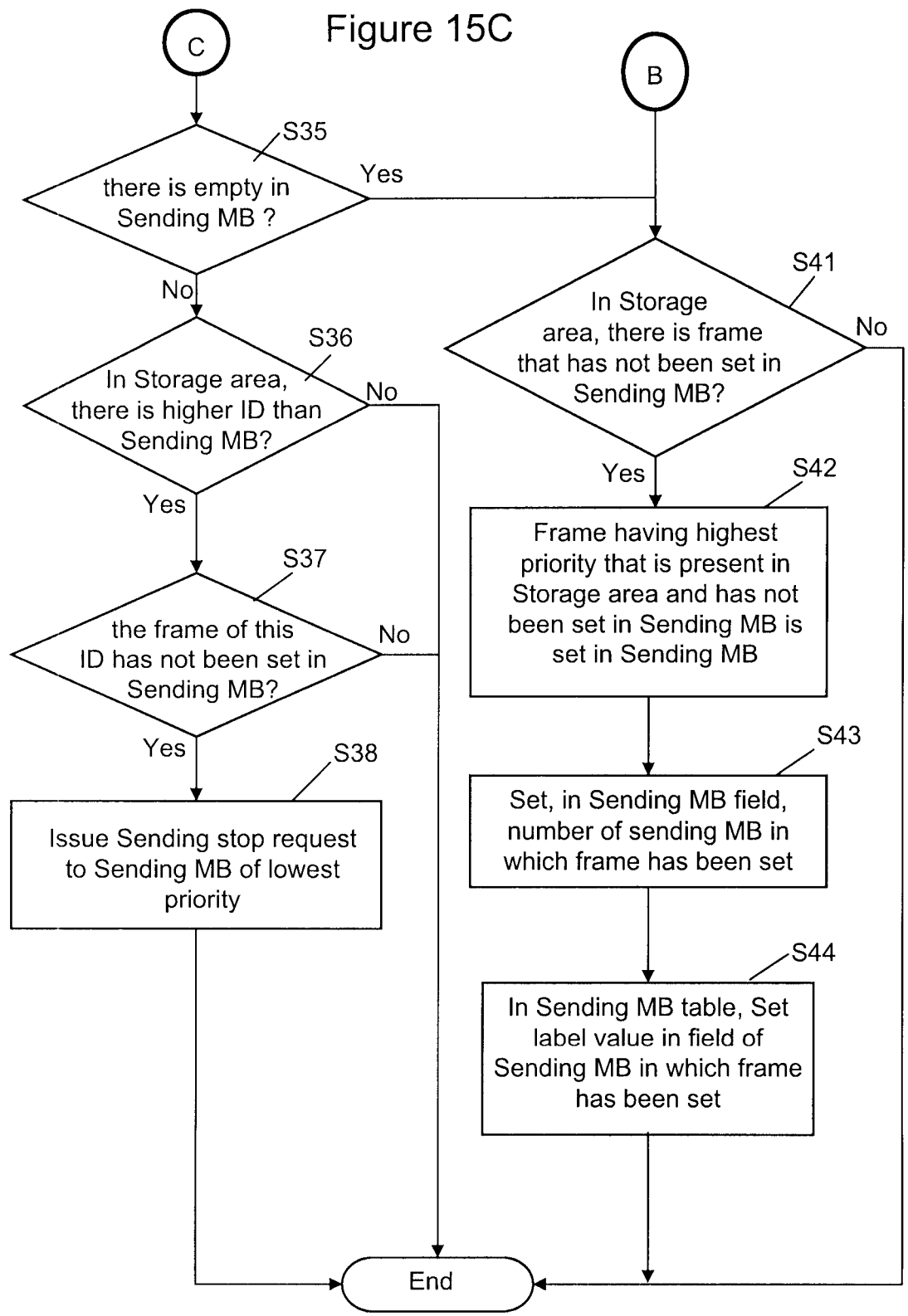

FIG. 15 is a flowchart of a control process for sending a frame of data from the priority order storage area 27 to the first sending MB31, which is performed by the sending controlling part 13. This process is repeatedly performed, for example in predetermined time intervals. Here, the "storage area" in the figure indicates the priority order storage area 27.

For the sake of clarity, this process will be described from a state where any frame is not stored in the priority order storage area or the first sending MB31 (MB1 through MB3). In such a state, because any frame is not stored in the sending MB1-MB3, the determinations of steps S21 and S22 are No, and the determination of step S25 is No. The process exits.

Thereafter, it is assumed that a new frame of data is stored in the priority order storage area 27 by the receiving control process of FIG. 13. In this case, the determination of step S25 is Yes, and the determination of step S26 is No. The process proceeds to step S41, in which it is determined whether a frame that has not been set (stored) in any of the sending MB1-MB3 is present in the priority order storage area 27. This can be determined by examining whether there is a frame of data for which the value of the receiving field is 1 and the value of the sending MB field is zero in the priority order storage area 27. If such a frame is not present, it indicates that there is no frame to be transferred to the sending MB and hence the process exits. On the other hand, this determination is Yes when the above new frame of data is stored in the priority order storage area 27.

In step S42, among frames that has not been set in any of the sending MB1-MB3, a frame having a highest priority, that is, having a smallest label value is selected, and then is set (stored) in any of the sending MB1-MB3. (Here, because the determination of S26 is No, all the sending MB1-MB3 are empty. Although any sending MB may be used, it is generally to start using the sending MB1.) Thus, the above new frame is set in any of the sending MBs.

In step S43, a number of the sending MB in which the frame has been stored in S42 (if the frame is stored in MB1, the value of 1) is set in the sending MB field corresponding to the frame of the priority order storage area 27 by updating. In step S44, the value in the field of the corresponding sending MB in the sending MB table 29 is updated to the label value of the frame thus stored in S42. Thus, data is transferred from the priority order storage area 27 to the first sending MB31 in the order of priority. As described above, the frame set in the sending MB is outputted to the bus in the order of priority by a control of the CAN module 11.

Thereafter, if a new frame of data is received in the priority order storage area 27 when any of the sending MB1-MB3 has a frame, the determinations of steps S25 and S26 are Yes. In step S27, it is determined whether a frame having the same ID as the frame(s) set in the sending MB1-MB3 is present in the priority order storage area 27. This can be implemented by comparing the label value(s) set in the MB1-MB3 fields of the sending MB table 29 with the label value(s) for which the receiving flag is 1 in the priority order storage area 27. If it is determined that such a frame is present, it is determined whether this frame thus determined as being present has not been set in the sending MB, which can be implemented by determining whether the sending MB field for the ID of this frame is zero or not.

If the determination of step S27 or S28 is No, it indicates that a frame having an ID that has not been set in the sending MB1-MB3 is newly present in the priority order storage area 27. In step S35, it is determined whether there is an empty in any of the sending MB1-MB3 by determining whether zero is set in any field of the sending MB table 29. If there is an empty, the subsequence process from step S41 is performed. That is, the frame of data that has been received in the priority order storage area 27, but has not been set in the sending MB1-MB3, is set in the empty sending MB in the order of priority.

In step S35, if there is no empty in the sending MB1-MB3, an operation for forcefully creating an empty sending MB is performed in steps S36 to S38 as described referring to FIG. 8. That is, in step S36, it is examined whether a frame of data having a higher priority than the frame stored in any of the sending MB1-MB3 is present in the priority order storage area 27. This can be implemented by comparing the label value(s) in the sending MB table 29 with label value(s) for which the receiving field is 1 in the priority order storage area 27. If such a frame is not present (S36 is No), it indicates that the frame(s) in the sending MB1-MB3 has a higher priority. Therefore, the process exits without forcefully creating an empty sending MB.

If such a frame is present, it is determined whether this frame has not been set in any sending MB by examining whether the sending MB field of this frame that is present and has a higher priority is zero or not, in step S37. If this frame has been set in any sending MB, it is not required to forcefully create an empty sending MB (S37 is No), and hence the process exits.

If the determinations of steps S36 and S37 are Yes, it indicates that a frame of data having a higher priority than the frame(s) set in the sending MB1-MB3 is present in the storage area 27. In step S38, by referring to the sending MB table 29, a sending MB having a lowest priority or a largest label value is selected. The sending stop request signal is issued to the selected sending MB, and the process exits.

When the process is performed again, because the sending stop request signal has been issued as described above, the determination of step S21 is Yes. In step S31, it is determined whether stop of the sending is completed. As described above, the CAN module 11 starts the stop process when an acknowledge reply is sent in response to the sending stop request signal. If the stop process is completed, the stop completion signal is issued to the sending controlling part 13.

Until the stop completion signal is received, or when a negative acknowledge reply is received in response to the sending stop request signal, the determination of step S31 is No. Therefore, the subsequent process from step S25 is performed as usual. If the stop completion signal is received, the determination of step S31 is Yes.

In step S32, as described above, for a frame of data of the sending MB thus stopped, the sending MB field of the priority order storage area 27 is cleared to zero. In step S33, the label value of the sending MB thus stopped of the sending MB table 29 is cleared to zero. Thus, the frame of data is kept in the storage area 27 while indicating that sending the frame to the bus is not completed.

Because the sending MB becomes empty due to the stop of the sending, the determination of step S35 is Yes. In the subsequent process from step S41, the new frame of data as described above is to be set in the empty sending MB.

Thereafter, if the CAN module 11 completes sending the frame of data set in this sending MB to the bus, the determination of step S22 is Yes. In step S23, the frame of data for which the sending is completed is deleted from the storage area 27. The corresponding receiving flag field is updated from 1 to zero. In step S24, the label value of the sending MB for which the sending is completed of the sending MB table 29 is cleared to zero.

On the other hand, when the determinations of steps S27 and S28 are Yes, that is, when a frame of data having the same ID in any of the sending MB1-MB3 is present in the storage area 27 and has not been set in the sending MB1-MB3, the process proceeds to step S29. In order to overwrite the sending MB having the same ID with this frame in the priority order storage area 27, the sending stop request signal is issued to the sending MB. After the sending stop request signal is issued, the sending MB is made empty by the process of steps S21, S31-S33. The empty sending MB is overwritten with the frame in the storage area 27 in the subsequent process from step S41.

Figure 16:
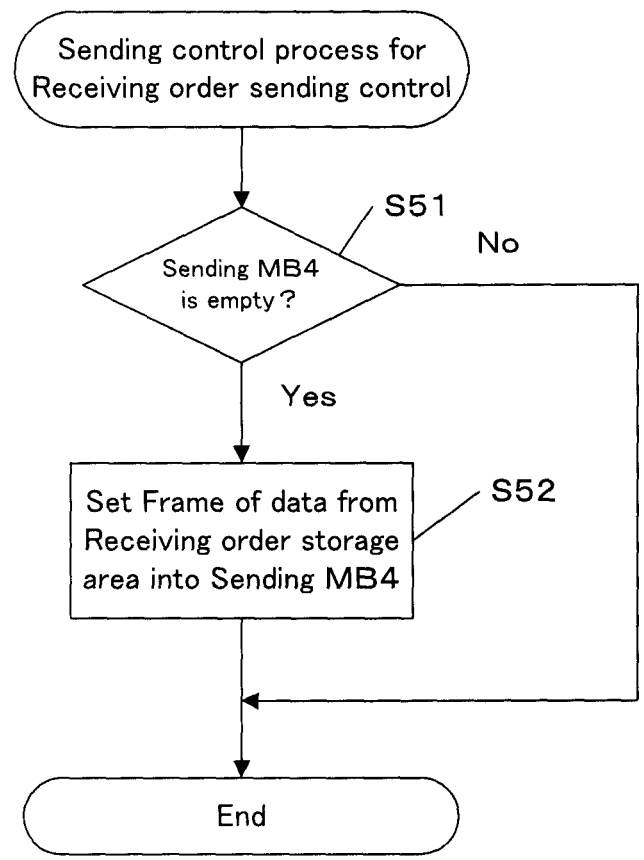
FIG. 16 shows a flowchart of a sending control process according to a receiving order in accordance with one embodiment of the present invention.

FIG. 16 is a flowchart of a control process for sending a frame of data from the receiving order storage area 28 to the second sending MB32 (sending MB4), which is performed by the sending controlling part 13.

In step S51, it is determined whether there is an empty in the sending MB4. When this process is performed for the first time (for example, the ignition is turned on), it is determined that there is an empty in the sending MB4 because any frame has not been transferred to the sending MB4. Furthermore, if the sending completion signal for a frame stored in the sending MB4 is received from the CAN module 11, it is determined that there is an empty in the sending MB4.

If there is no empty (S51 is No), the process exits. If there is an empty (S51 is Yes), a frame of data from the receiving order storage area 28 is stored (set) in the sending MB4 by overwriting in step S52.

The processes of FIGS. 15 and 16 may be performed in parallel.

The above embodiments use the CAN as the communication protocol. However, the present invention is not limited to the CAN and is applicable to another communication protocol.

The present invention should not be limited to the foregoing description of the embodiments and may be taken into practice by adding various modifications to the foregoing embodiments without departing from the gist of the invention.

What is claimed is:

1. A gateway apparatus, to which a plurality of networks are connected, for transferring data from one network to another network, each data having an identifier which indicates whether said data should be sent to another network in an order of priority specified by said identifier or in an order in which said data is received, and the apparatus comprising:

a buffer means, when data is received from the one network, for storing the received data, the data including a first type of data that should be sent in the order of priority and a second type of data that should be sent in the order in which the data is received, the first type of data being different than the second type of data;

a control means for serially sending the data stored in the buffer means to the another network in accordance with a priority of the identifier attached to the data stored in the buffer means; and sending message boxes for temporarily storing data transferred from the buffer means such that the data is waiting to be sent, wherein the buffer means includes a first storage area for storing only the received first type of data in the order of priority, and a second storage area for storing only the received second type of data in the order in which the data is received, wherein the sending message boxes include a plurality of first sending message boxes for storing only the first type of data transferred from the first storage area of the buffer means and a single second sending message box for storing only the second type of data transferred from the second storage area of the buffer means, wherein the number of the first sending message boxes is less than a number of the identifiers, wherein the control means stores the received data in one of the first storage area and the second storage area based on the identifier attached to the received data, the first type of data having an identifier of a first type and the second type of data having an identifier of a second type, wherein the control means serially sends the data stored in the first storage area and the second storage area to the another network in accordance with the priority of the identifier attached to the data, by serially sending the data stored in the first sending message boxes and the second sending message box to the another network in accordance with the priority of the identifier of the data.

2. The gateway apparatus of claim 1, wherein, in the second storage area, the second type of data consisting of a plurality of data blocks is stored on a data-block by data-block basis in the order in which the data blocks are received, wherein the control means serially sends the second type of data stored in the second sending message box with a higher priority over the first sending message boxes until sending of the plurality of data blocks to the another network is completed.

3. The gateway apparatus of claim 1, wherein the control means stores, in the second storage area, the second type of data to which an identifier corresponding to data used for diagnosis and maintenance of a vehicle is attached.

* * * * *